United States Patent
Yoo et al.

(10) Patent No.: US 9,876,893 B2
(45) Date of Patent: Jan. 23, 2018

(54) MOBILE TERMINAL ALTERING OPERATION WHEN COUPLED WITH AUDIO SUB MODULE

(71) Applicant: LG ELECTRONICS INC., Seoul (KR)

(72) Inventors: Sukhun Yoo, Seoul (KR); Jongwon Seo, Seoul (KR); Seoungmyun Oh, Seoul (KR); Jonghwan Lee, Seoul (KR); Jihoon Kim, Seoul (KR); Minyong Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/211,274

(22) Filed: Jul. 15, 2016

(65) Prior Publication Data

US 2017/0237845 A1 Aug. 17, 2017

(30) Foreign Application Priority Data

Feb. 15, 2016 (KR) .................. 10-2016-0017344

(51) Int. Cl.
*H04W 88/02* (2009.01)
*H04M 1/725* (2006.01)
(Continued)

(52) U.S. Cl.
CPC .......... *H04M 1/7253* (2013.01); *G06F 3/165* (2013.01); *H04R 3/12* (2013.01); *H04W 4/001* (2013.01); *H04W 4/008* (2013.01); *H04W 88/02* (2013.01)

(58) Field of Classification Search
CPC .. H04M 1/0202; H04M 1/72527; H04M 1/62; H04M 1/60; H04M 1/6058;
(Continued)

(56) References Cited

U.S. PATENT DOCUMENTS

2010/0208434 A1* 8/2010 Kim ...................... G06F 1/1626
361/729
2014/0187289 A1 7/2014 Cataldo et al.
2015/0078575 A1* 3/2015 Selig .................... H04R 1/1091
381/74

FOREIGN PATENT DOCUMENTS

KR 20100094076 8/2010
KR 20120030866 3/2012
(Continued)

OTHER PUBLICATIONS

PCT International Application No. PCT/KR2016/007042, International Search Report dated Nov. 14, 2016, 10 pages.
(Continued)

*Primary Examiner* — Philip Sobutka
(74) *Attorney, Agent, or Firm* — Lee, Hong, Degerman, Kang & Waimey

(57) ABSTRACT

A mobile terminal and a mobile terminal audio signal processing system including the same are disclosed. The mobile terminal includes a first body including an opening, a main circuit board, and a main earphone jack, a first audio signal processing body including a first circuit board, on which a sub-sound module receiving a digital audio signal from the first body and converting the digital audio signal into an analog audio signal is mounted, and a sub-earphone jack outputting the analog audio signal, and a controller outputting a first audio signal to the sub-earphone jack and outputting a second audio signal to the main earphone jack. The first audio signal processing body is a first state where the first audio signal processing body is coupled with the opening, or a second state where the first audio signal processing body is separated from the first body.

19 Claims, 27 Drawing Sheets

(51) Int. Cl.
*G06F 3/16* (2006.01)
*H04R 3/12* (2006.01)
*H04W 4/00* (2009.01)

(58) Field of Classification Search
CPC ....... H04M 1/03; H04W 88/02; H04W 88/00;
H04W 4/001; H04W 4/008
USPC ............. 455/550.1, 557, 569.1, 575.1–575.9
See application file for complete search history.

(56) References Cited

FOREIGN PATENT DOCUMENTS

| | | |
|---|---|---|
| KR | 20130022027 | 3/2013 |
| KR | 20130119581 | 11/2013 |
| KR | 20150064955 | 6/2015 |
| KR | 20150073514 | 7/2015 |

OTHER PUBLICATIONS

Korean Intellectual Property Office Application Serial No. 10-2016-0017344, Notice of Allowance dated Jul. 28, 2017, 2 pages.

* cited by examiner

MOBILE TERMINAL ALTERING OPERATION WHEN COUPLED WITH AUDIO SUB MODULE

Pursuant to 35 U.S.C. §119(a), this application claims the benefits of earlier filing date and right of priority to Korean Patent Application No. 10-2016-0017344 filed on Feb. 15, 2016, the contents of which are all hereby incorporated by reference herein in its entirety.

BACKGROUND OF THE INVENTION

Field of the Invention

The present disclosure relates to a mobile terminal and a mobile terminal audio signal processing system including the same. More particularly, the present disclosure relates to a mobile terminal capable of individually providing an audio signal for a main earphone jack and a sub-earphone jack and a mobile terminal audio signal processing system including the mobile terminal.

Discussion of the Related Art

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, capturing images and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, etc. Efforts are ongoing to support and increase the functionality of the mobile terminals.

Such efforts include software and hardware improvements, as well as changes and improvements in the structural components.

SUMMARY OF THE INVENTION

In one aspect, there is provided a mobile terminal comprising a first body including a display located on at least one surface of the first body, an opening located on one side of the first body, a main circuit board, and a main earphone jack located on another side of the first body, a first audio signal processing body including a first circuit board, on which a sub-sound module receiving a digital audio signal from the first body and converting the digital audio signal into an analog audio signal is mounted, and a sub-earphone jack outputting the analog audio signal, the first audio signal processing body being in one of a first state where the first audio signal processing body is coupled with the opening of the first body and a second state where the first audio signal processing body is separated from the first body, and a controller configured to output a first audio signal to the sub-earphone jack and output a second audio signal to the main earphone jack while outputting an audio signal in the first state.

In the first state, the controller may be configured to cause the main earphone jack and the sub-earphone jack to be in one of an activated state of responding to the audio signal and an inactivated state of not responding to the audio signal.

The audio signal may include an event signal including a message reception event signal, a call reception event signal, and an alarm event signal and a content signal corresponding to sound contents stored.

The controller may be configured to change an output object of the audio signal depending on a touch input of a user obtained through the display.

The audio signal may include an event signal including a message reception event signal, a call reception event signal, and an alarm event signal and a content signal corresponding to sound contents stored. The controller may be configured to output the event signal and the content signal to one of the main earphone jack and the sub-earphone jack. The controller may be configured to output the content signal to the other of the main earphone jack and the sub-earphone jack.

The controller may be configured to output status information obtained from another terminal to at least one of the main earphone jack and the sub-earphone jack.

The mobile terminal may further comprise a second audio signal processing body including a second speaker and connected to the main earphone jack. The first audio signal processing body may further include a first speaker.

In another aspect, there is provided a mobile terminal audio signal processing system comprising a first body including a display located on at least one surface of the first body, an opening located on one side of the first body, a main circuit board, and a main earphone jack located on another side of the first body, a second body having a shape, in which one end of the second body is capable of being inserted into the opening of the first body, a first audio signal processing body including a first circuit board, on which a sub-sound module receiving a digital audio signal and converting the digital audio signal into an analog audio signal is mounted, and a sub-earphone jack outputting the analog audio signal, the first audio signal processing body having a shape, in which one end of the first audio signal processing body is capable of being inserted into the opening of the first body, and a second audio signal processing body coupled with and separated from the first audio signal processing body, the second audio signal processing body including a second circuit board, wherein the first body is in one of a first coupling mode, in which the first body is coupled with the second body, and a second coupling mode, in which the first body is coupled with the first audio signal processing body.

When the first body is in the first coupling mode, the first body and the second body may form a mobile terminal, and the first audio signal processing body and the second audio signal processing body may form an audio signal processing device. The mobile terminal may include a short range communication module wirelessly transmitting an audio signal to the audio signal processing device When the first body is in the first coupling mode, the first body and the second body may form a mobile terminal, and the first audio signal processing body and the second audio signal processing body may form an audio signal processing device. The second audio signal processing body may include a sub-USB module wired receiving an audio signal from the mobile terminal.

When the mobile terminal is connected to the audio signal processing device, the mobile terminal may include a controller configured to output an audio signal to the audio signal processing device.

When the mobile terminal is connected to the audio signal processing device, the controller may be configured to install an application outputting the audio signal to the audio signal processing device in the mobile terminal if the application is not installed in the mobile terminal.

A main sound module converting the digital audio signal into the analog audio signal may be mounted on the main circuit board. The sub-sound module converting the digital audio signal into the analog audio signal may be mounted on the first circuit board.

The mobile terminal audio signal processing system may further comprise a controller configured to cause the first body to transmit the digital audio signal to the main sound module in the first coupling mode and to transmit the digital audio signal to the sub-sound module in the second coupling mode.

When the first body is in the first coupling mode, the first audio signal processing body and the first body may form a mobile terminal. The mobile terminal may include a controller configured to output a first audio signal to the sub-earphone jack and output a second audio signal to the main earphone jack while outputting an audio signal.

The mobile terminal may include the second audio signal processing body including a second speaker and connected to the main earphone jack. The first audio signal processing body may include a first speaker. The controller may be configured to output a first audio signal to the first speaker and output a second audio signal to the second speaker while outputting an audio signal.

In yet another aspect, there is provided an audio signal processing device comprising a first audio signal processing body including a first circuit board, on which a sub-sound module receiving a digital audio signal and converting the digital audio signal into an analog audio signal is mounted, a sub-earphone jack outputting the analog audio signal, and a first connector, and a second audio signal processing body coupled with and separated from the first audio signal processing body, the second audio signal processing body including a second circuit board and a second connector corresponding to the first connector, wherein the first audio signal processing body is in one of a first processing mode, in which the first audio signal processing body is coupled with other terminal and receives the digital audio signal from the other terminal, a second processing mode, in which the first audio signal processing body wirelessly receives the digital audio signal from the other terminal separated from the first audio signal processing body, and a third processing mode, in which the first audio signal processing body receives the digital audio signal through the second audio signal processing body connected to the other terminal.

The second audio signal processing body may include a sub-USB module, that is connected to the other terminal, receives the digital audio signal from the other terminal, and transmits the digital audio signal to the second circuit board. When the first audio signal processing body is in the third processing mode, the second circuit board may transmit the transmitted digital audio signal to the first circuit board through the second connector and the first connector.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
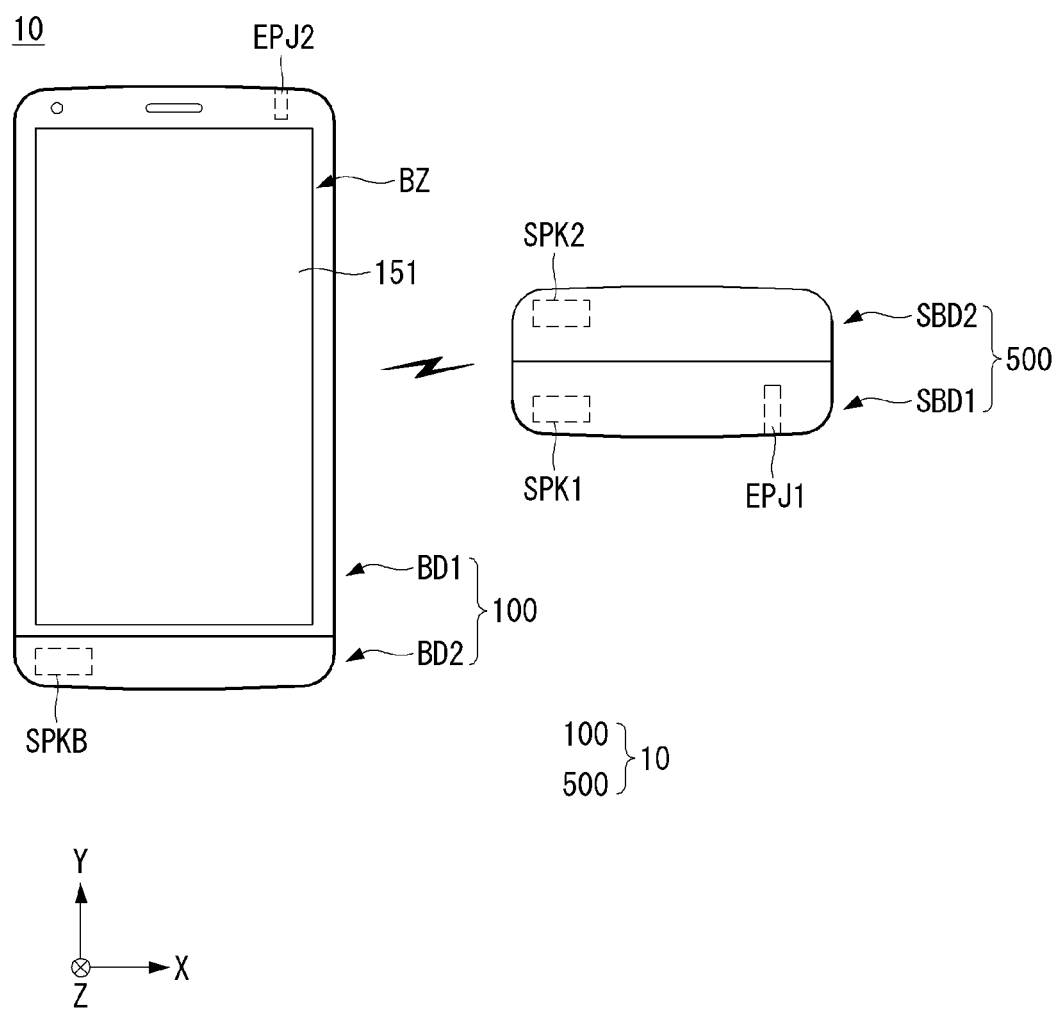
FIG. 1 illustrates a mobile terminal audio signal processing system according to an embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Electronic devices disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of electronic devices. However, such teachings apply equally to other types of electronic devices, such as those types noted above. In addition, these teachings may also be applied to stationary terminals such as digital TV, desktop computers, and the like.

FIG. 1 illustrates a mobile terminal audio signal processing system according to an embodiment of the invention.

More specifically, FIG. 1 is a front view of a mobile terminal audio signal processing system 10 according to an embodiment of the invention. In the embodiment disclosed herein, a coordinate system is a rectangular coordinate system and is a Cartesian coordinate system, i.e., a XYZ coordinate system. In the embodiment disclosed herein, the XYZ coordinate system is a left-handed coordinate system. Namely, when fingers of a left hand are curled from the X-axis to the Y-axis, a direction in which a thumb of the left hand points is the Z-axis.

In the embodiment disclosed herein, an audio signal may include an event signal and a content signal in a broad sense. Examples of the event signal may include a message reception event signal, a call reception event signal, an alarm event signal, and the like. The content signal may include sound contents stored. Further, the audio signal may include a digital audio signal and an analog audio signal. The digital audio signal may be a signal configured as a combination of '0' and '1', and the analog audio signal may be a signal determined by an intensity and a frequency of an electric signal.

The mobile terminal audio signal processing system 10 according to the embodiment of the invention may include a first body BD1, a second body BD2, a first audio signal processing body SBD1, and a second audio signal processing body SBD2.

The first body BD1 may be coupled with the second body BD2 or may be separated from the second body BD2. The first body BD1 may be positioned farther than the second body BD2 on the Y-axis. In the embodiment disclosed herein, the fact that something is far positioned on the Y-axis may indicate that something is positioned on an upper part (or an upper side). Further, the fact that something is close positioned on the Y-axis may indicate that the something is positioned on a lower part (or a lower side). Thus, the first body BD1 may be positioned on the upper part, and the second body BD2 may be positioned on the lower part.

The first audio signal processing body SBD1 may be coupled with or separated from the second audio signal processing body SBD2. The second audio signal processing body SBD2 may be positioned farther than the first audio signal processing body SBD1 on the Y-axis.

The first body BD1 may include an opening on one side. The first body BD1 may include a display 151 and a main earphone jack EPJ2. The display 151 may be positioned at a front surface of the first body BD1. In the embodiment disclosed herein, "a display unit' is interpreted as the same sense as the display 151. A bezel BZ may be formed to cover the display 151.

The first body BD1 may include a main circuit board. The main circuit board may process an electric signal. A main sound module may be mounted on the main circuit board. The main sound module may convert a digital audio signal into an analog audio signal.

The main earphone jack EPJ2 may be positioned on one side of the first body BD1. For example, the main earphone jack EPJ2 may be positioned on an upper side of the first body BD1. When an earphone terminal is inserted into the main earphone jack EPJ2, an audio signal may be supplied to an earphone.

The second body BD2 may have a shape capable of being inserted into the opening of the first body BD1. The second body BD2 may include a basic speaker SPKB. The basic speaker SPKB may radiate sound to the outside.

The first audio signal processing body SBD1 may include a sub-earphone jack EPJ1 and a first speaker SPK1. The first speaker SPK1 may radiate sound to the outside. The sub-earphone jack EPJ1 may be formed in the first audio signal processing body SBD1. For example, the sub-earphone jack EPJ1 may be formed on the lower side of the first audio signal processing body SBD1. When an earphone terminal is inserted into the sub-earphone jack EPJ1, an audio signal may be supplied to the earphone. One end of the first audio signal processing body SBD1 may have a shape capable of being inserted into the opening of the first body BD1.

The second audio signal processing body SBD2 may include an opening on one side. A portion of the first audio signal processing body SBD1 may be inserted into the opening of the second audio signal processing body SBD2. Namely, the second audio signal processing body SBD2 may be coupled with or separated from the first audio signal processing body SBD1.

A coupling relationship between the first body BD1, the second body BD2, the first audio signal processing body SBD1, and the second audio signal processing body SBD2 is described. The first body BD1 may be coupled with and/or separated from the second body BD2 or the first audio signal processing body SBD1. The second audio signal processing body SBD2 may be coupled with and/or separated from the second body BD2 or the first audio signal processing body SBD1. FIG. 1 illustrates a coupling state of the first body BD1 and the second body BD2. Further, FIG. 1 illustrates a coupling state of the first audio signal processing body SBD1 and the second audio signal processing body SBD2. As shown in FIG. 1, a mobile terminal 100 according to the embodiment of the invention may include the first body BD1 and the second body BD2. Further, an audio signal processing device 500 according to the embodiment of the invention may include the first audio signal processing body SBD1 and the second audio signal processing body SBD2.

In other words, the mobile terminal audio signal processing system 10 according to the embodiment of the invention may include the mobile terminal 100 and the audio signal processing device 500. The mobile terminal 100 and the audio signal processing device 500 may communicate with each other through near field communication. The mobile terminal 100 may provide an audio signal for the audio signal processing device 500 through the near field communication.

The mobile terminal 100 according to the embodiment of the invention may include a short range communication module and thus may wirelessly communicate with the audio signal processing device 500. Further, the mobile terminal 100 may wired communicate with the audio signal processing device 500. The mobile terminal 100 may communicate with the audio signal processing device 500 in a USB manner. In other words, the mobile terminal 100 may provide a digital audio signal for the audio signal processing device 500 using USB communication or wireless communication. A digital audio signal transmitted to the audio signal processing device 500 may be converted into an analog audio signal.

When the mobile terminal 100 according to the embodiment of the invention is wirelessly or wired connected to the audio signal processing device 500, the mobile terminal 100 may output the digital audio signal to the audio signal processing device 500. The mobile terminal 100 may include a controller 180 (refer to FIG. 20). The controller 180 may determine whether or not the mobile terminal 100 is connected to the audio signal processing device 500. When the mobile terminal 100 is connected to the audio signal processing device 500, the controller 180 may transmit the digital audio signal to the audio signal processing device 500. The controller 180 may include an application transmitting the digital audio signal to the audio signal processing device 500.

The controller 180 may determine whether or not the application transmitting the digital audio signal to the audio signal processing device 500 is installed in the mobile terminal 100. When the controller 180 determines that the application transmitting the digital audio signal to the audio signal processing device 500 is not installed in the mobile terminal 100, the controller 180 may install the application transmitting the digital audio signal to the audio signal processing device 500 in the mobile terminal 100 if the mobile terminal 100 is connected to the audio signal processing device 500.

The application transmitting the digital audio signal to the audio signal processing device 500 installed by the controller 180 may be an installation program embedded in the mobile terminal 100. The application transmitting the digital audio signal to the audio signal processing device 500 installed by the controller 180 may be an installation program downloaded from a separate server.

The audio signal processing device 500 according to the embodiment of the invention may communicate with other external mobile terminal. The audio signal processing device 500 may wirelessly or wired communicate with other external mobile terminal. For example, the audio signal processing device 500 may receive an audio signal from other mobile terminal.

In a point of view of the first body BD1, when the first body BD1 is coupled with the second body BD2, the first body BD1 may be regarded as being in a first coupling mode. When the first body BD1 is coupled with the first audio signal processing body SBD1, the first body BD1 may be regarded as being in a second coupling mode. FIG. 1 illustrates an example where the first body BD1 is in the first coupling mode.

When the first body BD1 is in the first coupling mode, the mobile terminal 100 according to the embodiment of the invention may include a short range communication module 114 (refer to FIG. 20) wirelessly transmitting the audio signal to the audio signal processing device 500. The short range communication module 114 may use Bluetooth manner, for example. As the mobile terminal 100 wirelessly transmits the audio signal to the audio signal processing device 500, a user may listen to a sound file or a radio broadcast of the mobile terminal 100 through the audio signal processing device 500.

The first speaker SPK1 included in the audio signal processing device 500 may have a higher performance than the basic speaker SPKB included in the second body BD2. In this instance, the user may receive an improved sound. When the first body BD1 is in the first coupling mode in accordance with the embodiment of the invention, the embodiment of the invention may be similar to a speaker system of a related art Bluetooth communication manner. The mobile terminal audio signal processing system 10 according to the embodiment of the invention may be characterized in the point of that the first body BD1 can be in the second coupling mode as well as the first coupling mode.

When the first body BD1 is in the first coupling mode, the audio signal processing device 500 according to the embodiment of the invention may include a first circuit board and a second circuit board. The first circuit board and the second circuit board may process an electric signal. The first circuit board may include a sub-sound module converting a digital audio signal into an analog audio signal. The sub-sound module may use a high fidelity (Hi-Fi) manner. The sub-sound module may a main sound module may have a performance better than the main sound module.

Figure 2:
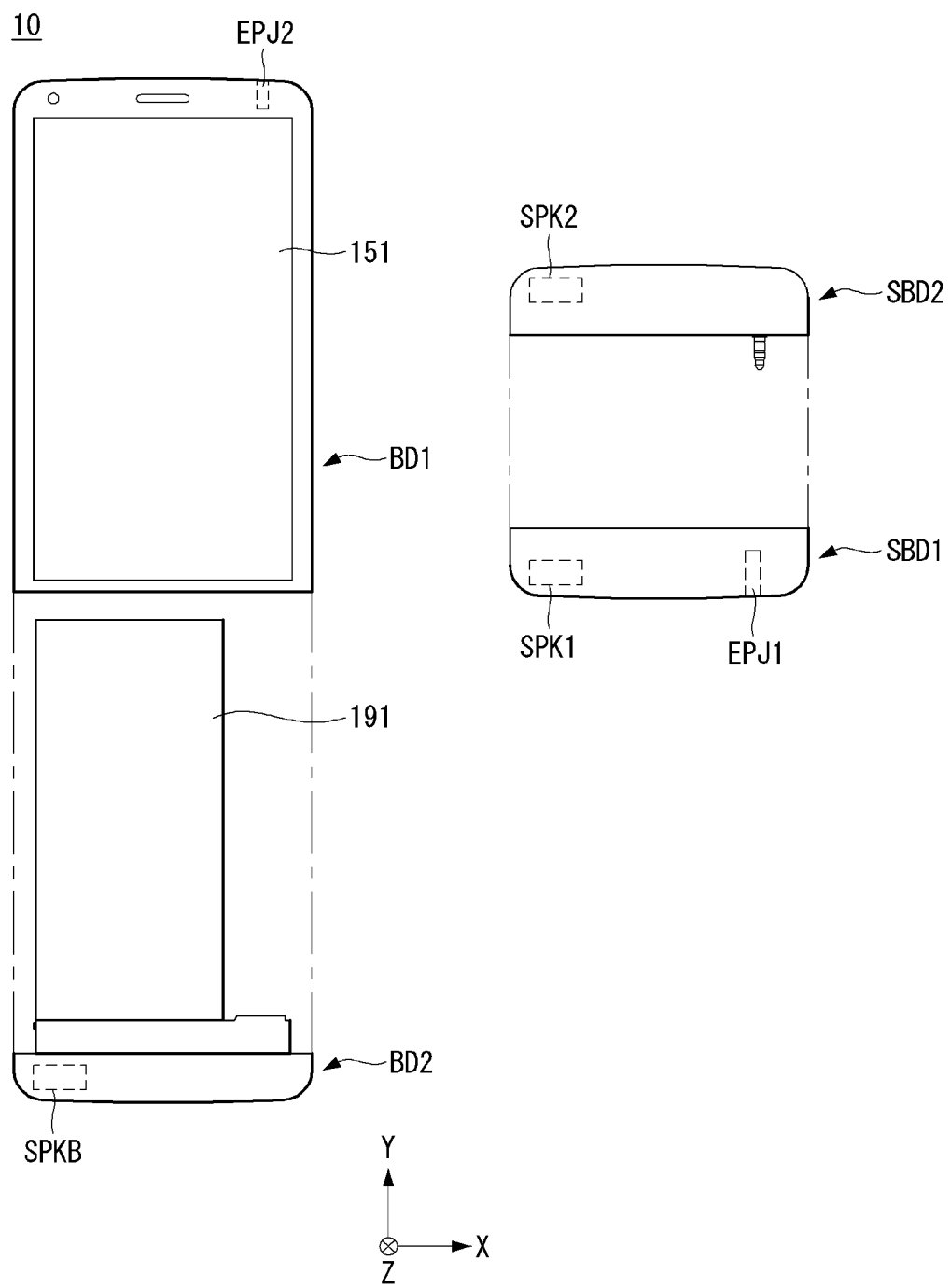
FIG. 2 illustrates a separation of a mobile terminal audio signal processing system shown in FIG. 1.

FIG. 2 illustrates a separation of the mobile terminal audio signal processing system shown in FIG. 1.

As shown in FIG. 2, the second body BD2 may be separated from the first body BD1. The second body BD2 may be connected to a battery 191. In other words, the battery 191 may be placed inside the first body BD1 and may be mounted on the second body BD2.

Namely, the battery 191 placed inside the first body BD1 may be electrically connected to the first body BD1 and may supply electric power to the first body BD1. Further, the battery 191 may be connected to the second body BD2 and fixed to the second body BD2. The battery 191 may be coupled with or separated from the second body BD2.

The coupling and the separation between the first body BD1 and the second body BD2 may be related to change of the battery of the mobile terminal 100. A cover of the mobile terminal 100 may be formed as one body along with the first body BD1. In particular, when a back cover is formed of metal, the cover of the mobile terminal 100 may not be separated from the first body BD1. In this instance, in a related art, it was difficult to change the battery of the mobile terminal 100. However, in the mobile terminal 100 according to the embodiment of the invention, the battery 191 may be connected to the second body BD2. Therefore, in the mobile terminal 100 according to the embodiment of the invention, the battery can be changed.

As shown in FIG. 2, the first audio signal processing body SBD1 may be separated from the second audio signal processing body SBD2.

Figure 3:
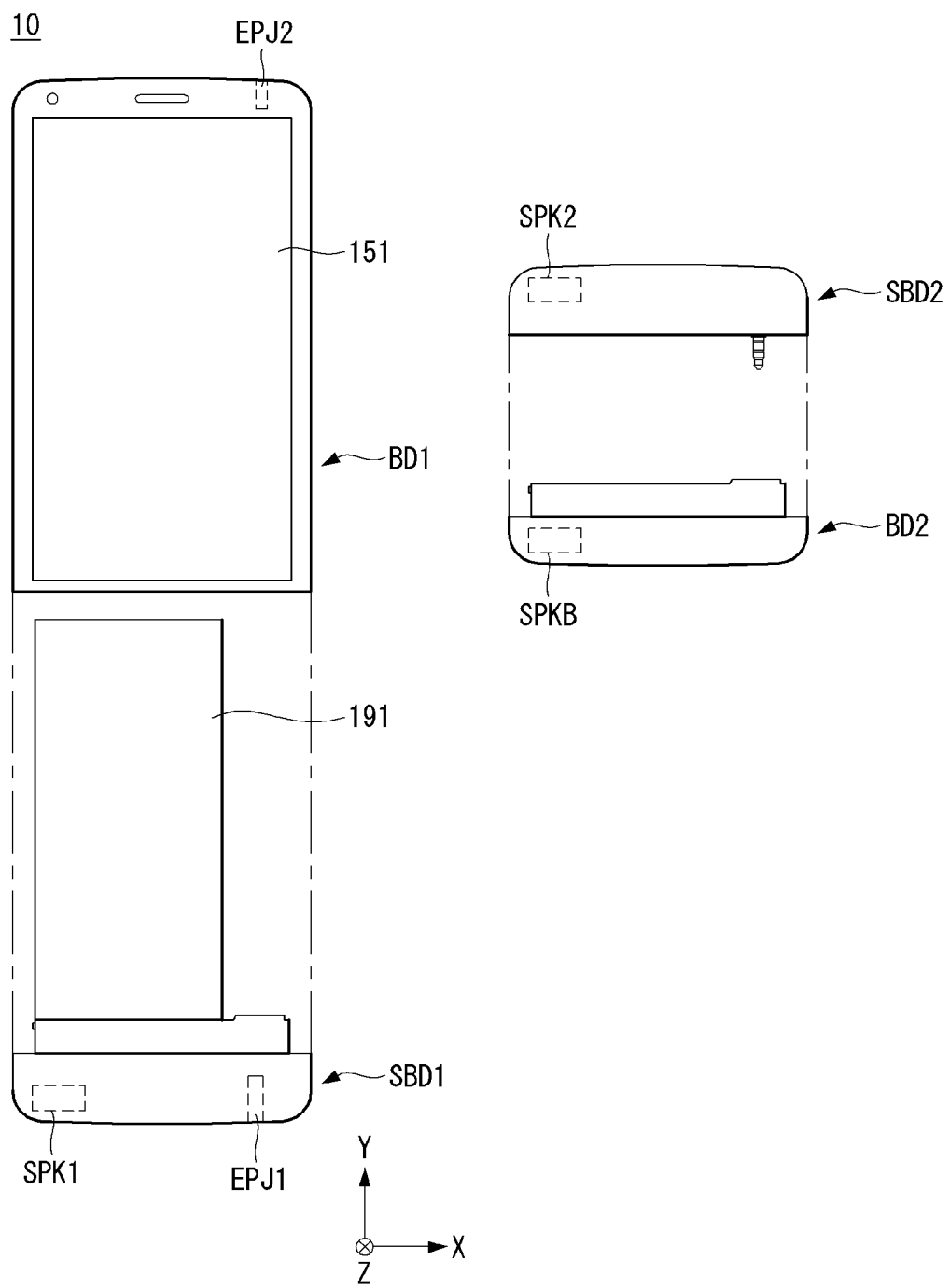
FIG. 3 illustrates coupling of a first audio signal processing body and a battery in accordance with an embodiment of the invention.

FIG. 3 illustrates the coupling of a first audio signal processing body and a battery in accordance with the embodiment of the invention.

As shown in FIG. 3, the battery 191 may be detached from the second body BD2 and may be attached to the first audio signal processing body SBD1. In this instance, the battery 191 coupled with the first audio signal processing body SBD1 may be charged fully.

As the battery 191 is coupled with the first audio signal processing body SBD1, the first audio signal processing body SBD1 may be coupled with the first body BD1 and may perform a function of the second body BD2. Namely, as the first audio signal processing body SBD1 is coupled with the first body BD1, the battery 191 may provide the electric power.

Figure 4:
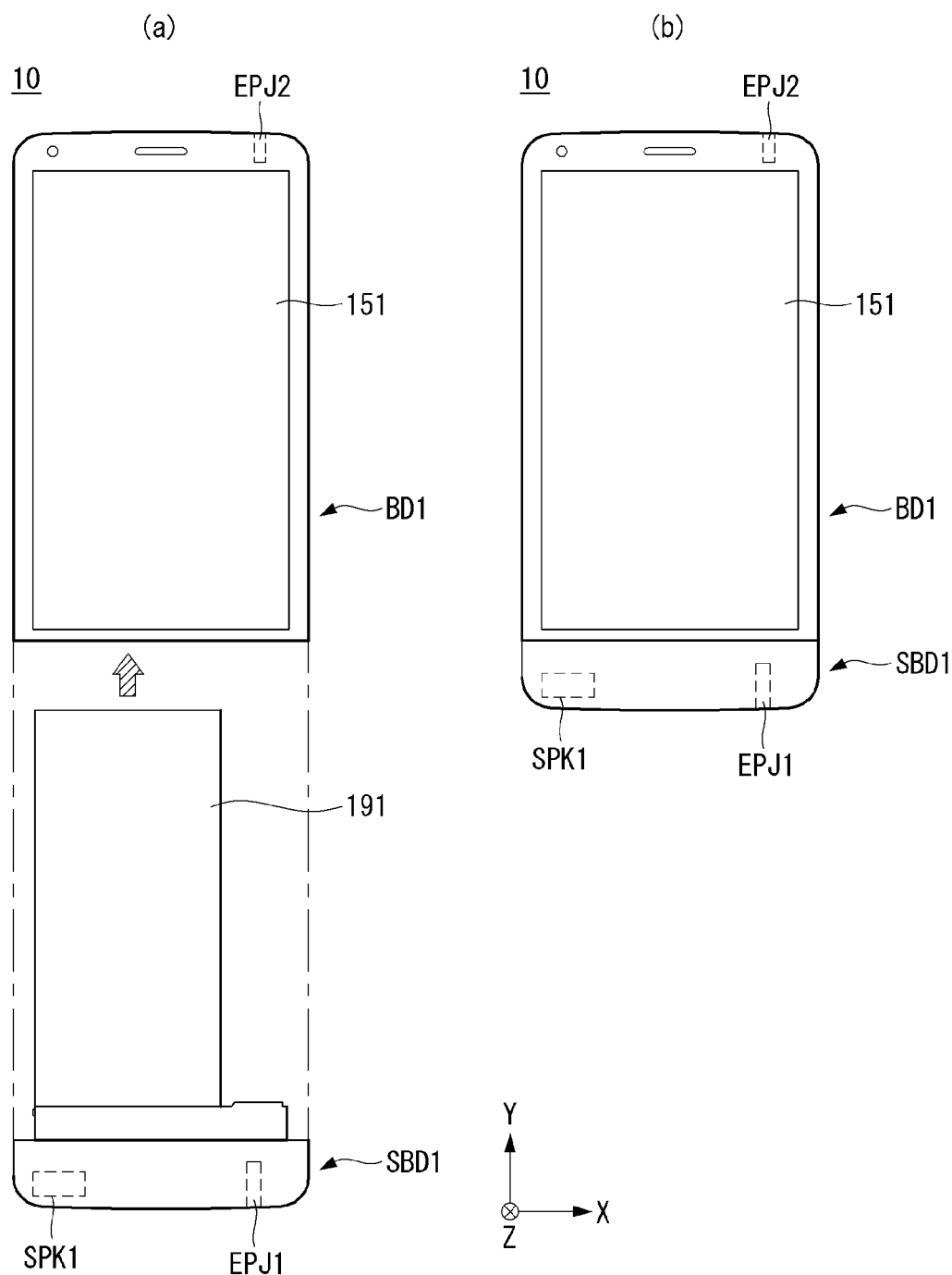
FIG. 4 illustrates coupling of a first body and a first audio signal processing body in accordance with an embodiment of the invention.

FIG. 4 illustrates coupling of the first body and the first audio signal processing body in accordance with the embodiment of the invention.

As shown in FIG. 4, the first body BD1 may be coupled with the first audio signal processing body SBD1. Namely, the first body BD1 may be in the second coupling mode. The first audio signal processing body SBD1 may replace the second body BD2 and may also perform additional functions. Namely, a new mobile terminal 100 may be formed by the coupling of the first audio signal processing body SBD1 and the first body BD1.

Namely, the mobile terminal 100 according to the embodiment of the invention may include the first audio signal processing body SBD1 and the first body BD1. Because the mobile terminal 100 includes the main earphone jack EPJ2 and the sub-earphone jack EPJ1, the mobile terminal 100 may process a plurality of audio signals. More specifically, the controller 180 of the mobile terminal 100 may output at least one of the plurality of audio signals to the main earphone jack EPJ2 and may output at least another of the plurality of audio signals to the sub-earphone jack EPJ1.

The main earphone jack EPJ2 and the sub-earphone jack EPJ1 may individually receive the audio signal. For example, a first audio signal may be supplied to the sub-earphone jack EPJ1, and a second audio signal may be supplied to the main earphone jack EPJ2. The controller 180 of the mobile terminal 100 may supply the first and second audio signals to the sub-earphone jack EPJ1 and the main earphone jack EPJ2, respectively. The first and second audio signals may be as same as or different from each other. By using the main earphone jack EPJ2 and the sub-earphone jack EPJ1, two users may individually receive different sounds from the mobile terminal 100.

Figure 5:
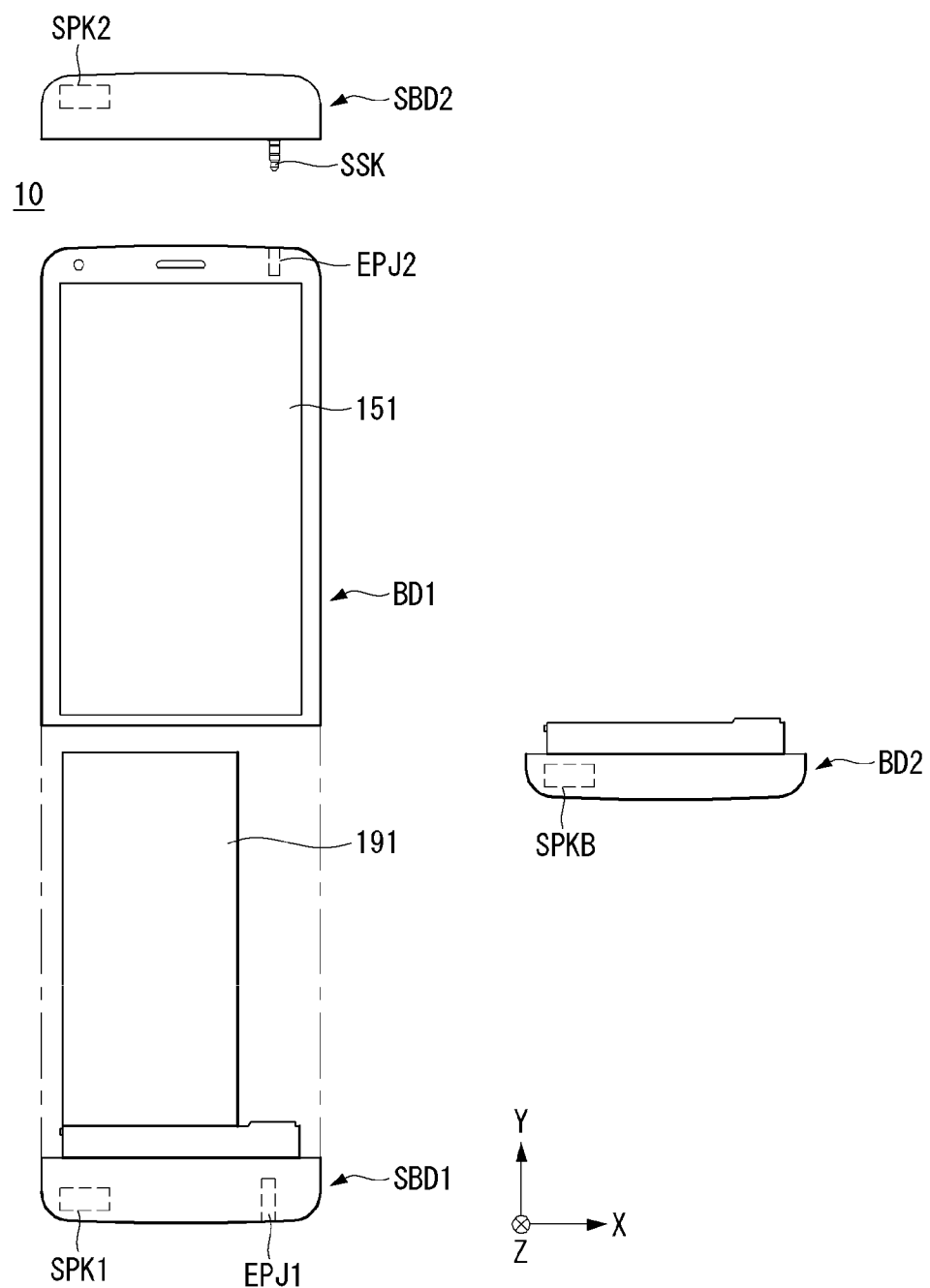
FIGS. 5 and 6 illustrate a shape, in which a second audio signal processing body is connected to a first body in accordance with an embodiment of the invention.
Figure 6:
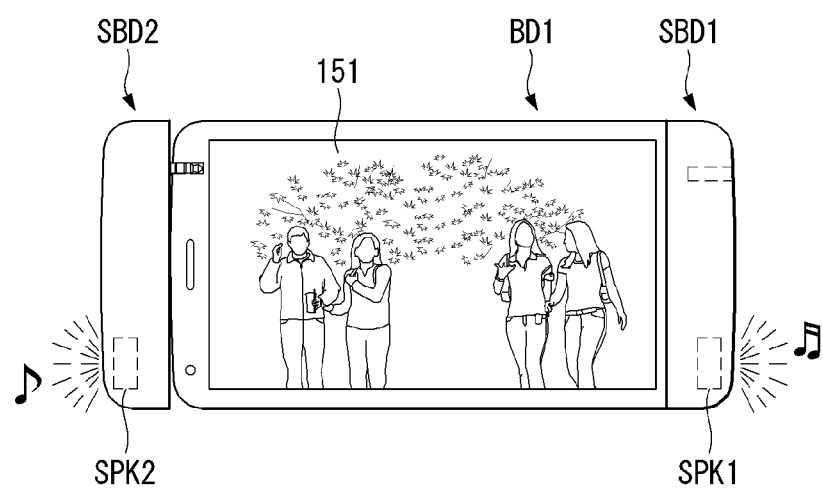

FIGS. 5 and 6 illustrate a shape, in which the second audio signal processing body is connected to the first body in accordance with the embodiment of the invention.

As shown in FIG. 5, one side of the second audio signal processing body SBD2 may be provided with a speaker earphone terminal SSK. The speaker earphone terminal SSK may be inserted into the main earphone jack EPJ2 and may be electrically connected to the main earphone jack EPJ2. Namely, the speaker earphone terminal SSK may be connected to the main earphone jack EPJ2 and may receive the electric signal converted from the audio signal. FIG. 5 is an exploded view of the mobile terminal 100, to which the second audio signal processing body SBD2 is connected.

As shown in FIG. 6, the second audio signal processing body SBD2 may be connected to one side of the first body BD1. Namely, the second audio signal processing body SBD2 may be electrically connected to the first body BD1 and also may be mechanically connected to the first body BD1. Hence, the second audio signal processing body SBD2 may be fixed to the first body BD1. The second audio signal processing body SBD2 may be opposite the first audio signal processing body SBD1 with the display 151 interposed therebetween.

As the second audio signal processing body SBD2 is connected to the first body BD1, the user may receive a surround sound using the mobile terminal 100. For example, when the user watches a video using the mobile terminal 100, the user can receive a more realistic sound. Namely, the mobile terminal 100 may supply the first and second audio signals to the first and second speakers SPK1 and SPK2 positioned on both sides of the display 151 and may radiate a sound to the outside.

The sound radiated by the mobile terminal 100 may have gone through a process that the controller provides an information about the sound for the first and the second speakers SPK1 and SPK2, and that the first and the second speakers SPK1 and SPK2 convert the information of the sound into the sound. The controller 180 may separate an information (for example, an audio signal) about a sound which will be radiated, into first and second audio signals. The first and second audio signals, may have different frequency ranges from each other and, may overlap each other. The first and second audio signals may be combined to form the audio signal.

Figure 7:
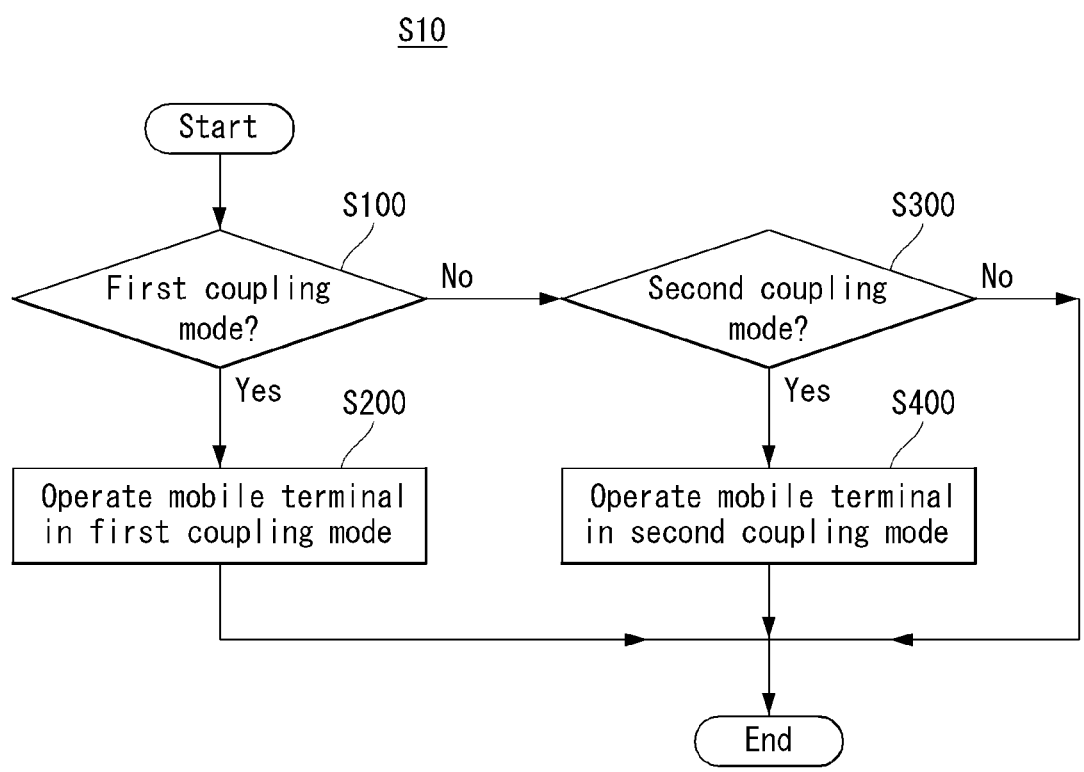
FIGS. 7 to 9 are flow charts illustrating operations of a mobile terminal and a mobile terminal audio signal processing system including the mobile terminal according to an embodiment of the invention.
Figure 8:
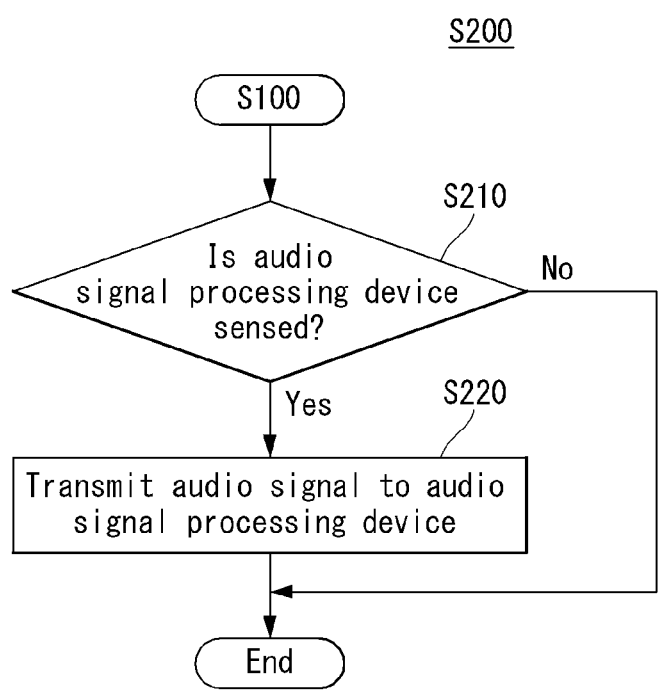
Figure 9:
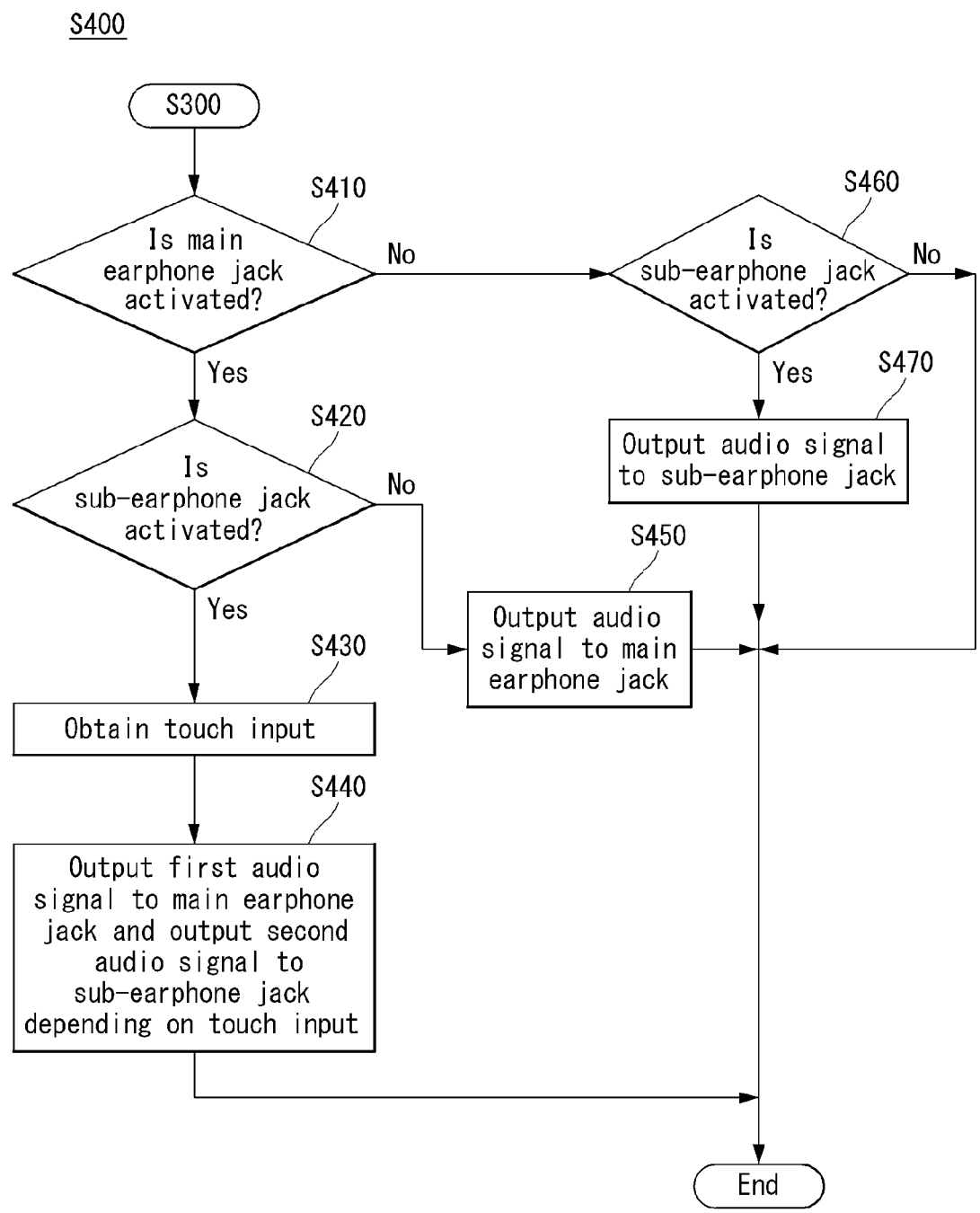

FIGS. 7 to 9 are flow charts illustrating operations of the mobile terminal and the mobile terminal audio signal processing system including the mobile terminal according to the embodiment of the invention.

More specifically, FIG. 7 is a flow chart illustrating an operation of the mobile terminal audio signal processing system 10 according to the embodiment of the invention. The mobile terminal audio signal processing system 10 according to the embodiment of the invention may include the mobile terminal 100.

The mobile terminal 100 may include the first body BD1 and the second body BD2 in the first coupling mode. Further, the mobile terminal 100 may include the first body BD1 and the first audio signal processing body SBD1 in the second coupling mode. Thus, it is preferable, but not required, that a type of the coupling mode is first checked because the components of the mobile terminal 100 may vary depending on the coupling mode.

Namely, the controller 180 of the mobile terminal audio signal processing system 10 according to the embodiment of the invention may determine whether or not the first body BD1 is in the first coupling mode in step S100.

When the first body BD1 is in the first coupling mode, the mobile terminal 100 may include the first body BD1 and the second body BD2. Further, when the first body BD1 is in the first coupling mode, the mobile terminal audio signal processing system 10 may include the audio signal processing device 500. In this instance, the audio signal processing device 500 may include the first audio signal processing body SBD1 and the second audio signal processing body SBD2. Namely, an operation method S10 of the mobile terminal audio signal processing system 10 may include a step S200 of operating the mobile terminal 100 in the first coupling mode. For example, when the first body BD1 is in the first coupling mode, the mobile terminal 100 may be connected to the audio signal processing device 500 through wireless communication, etc.

When the first body BD1 is not in the first coupling mode, the controller 180 may determine whether or not the first body BD1 is in the second coupling mode. Namely, the operation method S10 of the mobile terminal audio signal processing system 10 may include a step S300 of determining whether or not the first body BD1 is in the second coupling mode.

When the first body BD1 is in the second coupling mode, the mobile terminal 100 may include the first body BD1 and the first audio signal processing body SBD1. Further, when the first body BD1 is in the second coupling mode, the mobile terminal 100 may include the main earphone jack EPJ2 and the sub-earphone jack EPJ1. When the first body BD1 is in the second coupling mode, the operation method S10 of the mobile terminal audio signal processing system 10 may include a step S400 of operating the mobile terminal 100 in the second coupling mode.

FIG. 8 is a flow chart illustrating the operation step S200 of the mobile terminal 100 in the first coupling mode.

As shown in FIG. 8, the operation step S200 of the mobile terminal 100 in the first coupling mode may include a step S210 of sensing the audio signal processing device 500 and a step S220 of transmitting an audio signal to the audio signal processing device 500.

In the first coupling mode, the mobile terminal audio signal processing system 10 may include the mobile terminal 100 and the audio signal processing device 500. In the first coupling mode, the mobile terminal 100 may play a sound, etc. using the audio signal processing device 500. To this end, the mobile terminal 100 may need to first recognize the audio signal processing device 500.

The mobile terminal 100 may recognize the audio signal processing device 500 through Bluetooth manner, for example. After the mobile terminal 100 recognizes the audio signal processing device 500, the mobile terminal 100 may transmit the audio signal to the audio signal processing device 500 through the wireless communication. The audio signal processing device 500 may receive the audio signal and convert the audio signal into a sound.

FIG. 9 is a flow chart illustrating the operation step S400 of the mobile terminal 100 in the second coupling mode. In the second coupling mode, the mobile terminal 100 may include the main earphone jack EPJ2 and the sub-earphone jack EPJ1. Thus, the operation step S400 of the mobile terminal 100 in the second coupling mode may originate from a relationship between the main earphone jack EPJ2 and the sub-earphone jack EPJ1.

As shown in FIG. 9, the operation step S400 of the mobile terminal 100 in the second coupling mode may include a step S410 of determining whether or not the main earphone jack EPJ2 is activated.

When the main earphone jack EPJ2 is activated (or in an activated state), the main earphone jack EPJ2 may respond to the audio signal. Namely, when an earphone is inserted into the main earphone jack EPJ2, the controller 180 may output the audio signal to the main earphone jack EPJ2 if the main earphone jack EPJ2 is activated. Hence, the user may receive the sound through the earphone.

The operation step S400 of the mobile terminal 100 in the second coupling mode may include a step S420 of determining whether or not the sub-earphone jack EPJ1 is activated. When both the main earphone jack EPJ2 and the sub-earphone jack EPJ1 are activated, the mobile terminal 100 may obtain a touch input in step S430. Namely, the operation step S400 of the mobile terminal 100 in the second coupling mode may include the touch input receiving step S430. The obtained touch input may correspond to the selection of the main earphone jack EPJ2 and the sub-earphone jack EPJ1.

The operation step S400 of the mobile terminal 100 in the second coupling mode may include a step S440 of outputting the first audio signal to the main earphone jack EPJ2 and outputting the second audio signal to the sub-earphone jack EPJ1 through the controller 180 depending on the touch input.

When the sub-earphone jack EPJ1 is not activated and the main earphone jack EPJ2 is activated, the controller 180 may output the audio signal to the main earphone jack EPJ2 in step S450. Namely, the operation step S400 of the mobile terminal 100 in the second coupling mode may include a step S450 of outputting the audio signal to the main earphone jack EPJ2.

When the main earphone jack EPJ2 is not activated (or in an inactivated state), the activation or the inactivation of the sub-earphone jack EPJ1 may be a problem. Thus, the operation step S400 of the mobile terminal 100 in the second coupling mode may include a step S460 of determining whether or not the sub-earphone jack EPJ1 is activated.

When the main earphone jack EPJ2 is not activated and the sub-earphone jack EPJ1 is activated, the controller 180 may output the audio signal to the sub-earphone jack EPJ1. Namely, the operation step S400 of the mobile terminal 100 in the second coupling mode may include a step S470 of outputting the audio signal to the sub-earphone jack EPJ1.

Figure 10:
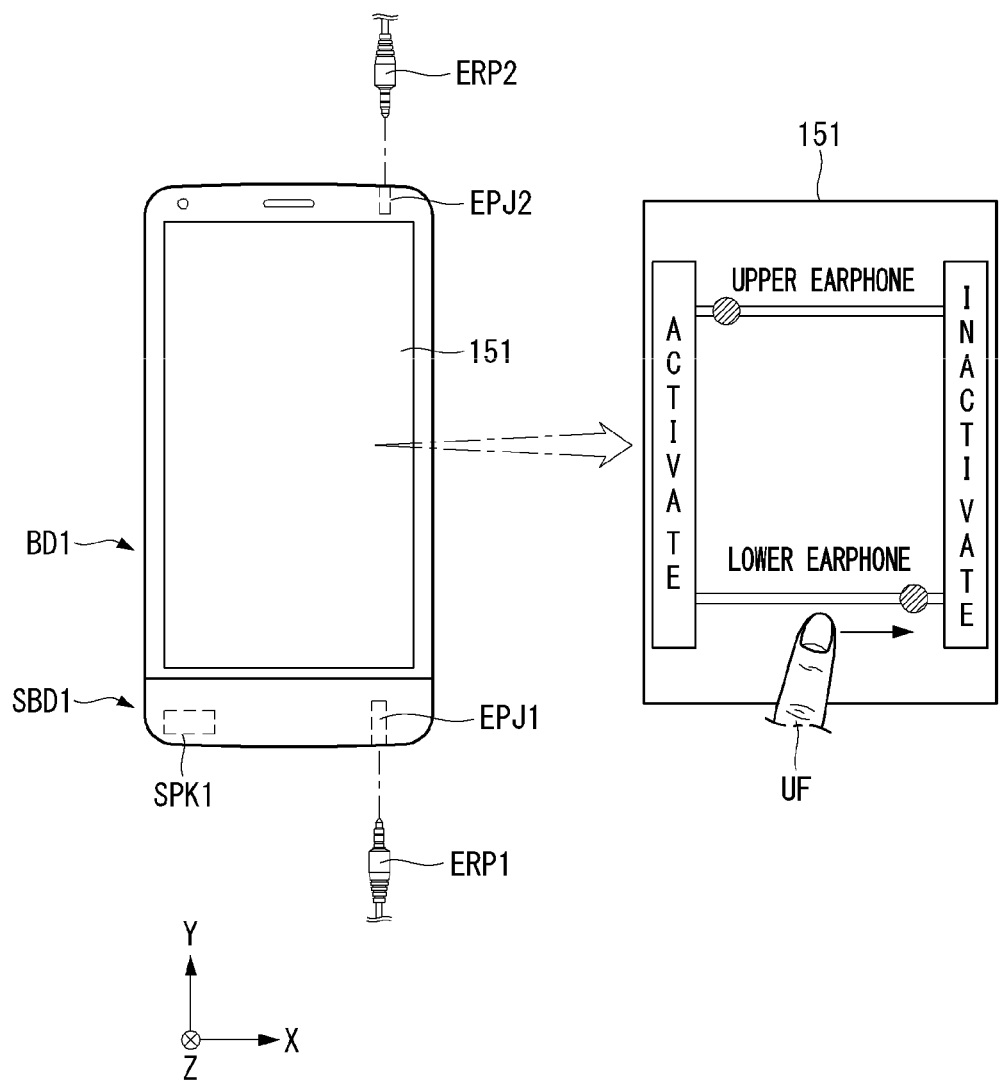
FIG. 10 illustrates whether or not a main earphone jack and a sub-earphone jack according to an embodiment of the invention are activated.

FIG. 10 illustrates whether or not the main earphone jack and the sub-earphone jack according to the embodiment of the invention are activated.

As shown in FIG. 10, the mobile terminal 100 according to the embodiment of the invention may include the main earphone jack EPJ2 and the sub-earphone jack EPJ1. There may be an example where both the main earphone jack EPJ2 and the sub-earphone jack EPJ1 are inactivated, an example where one of the main earphone jack EPJ2 and the sub-earphone jack EPJ1 is activated, and an example where both the main earphone jack EPJ2 and the sub-earphone jack EPJ1 are activated. In the embodiment disclosed herein, the activation (or the activated state) may indicate a state capable of responding to the audio signal. For example, the activated state of the sub-earphone jack EPJ1 may indicate that the sub-earphone jack EPJ1 can receive the audio signal, and the sound can be converted from the audio signal by the earphone inserted into the sub-earphone jack EPJ1. In other words, although the audio signal is supplied to the sub-earphone jack EPJ1 of an inactivated state, the sub-earphone jack EPJ1 may not respond to the audio signal.

An example where both the main earphone jack EPJ2 and the sub-earphone jack EPJ1 have to be activated may be considered. Further, an example where one of the main earphone jack EPJ2 and the sub-earphone jack EPJ1 has to be activated may be considered. The controller 180 may be electrically connected to the main earphone jack EPJ2 and the sub-earphone jack EPJ1 and may be concerned in their activation. Namely, the controller 180 may determine the activation of the main earphone jack EPJ2 and the sub-earphone jack EPJ1.

The activation of the main earphone jack EPJ2 and the sub-earphone jack EPJ1 may be determined depending on a user input. The user input may be performed through a touch input. The display 151 may obtain the touch input. For example, as shown in FIG. 10, the user may inactivate the sub-earphone jack EPJ1 positioned on the lower side of the mobile terminal 100 using his or her finger UF. Namely, the user may activate only the main earphone jack EPJ2 positioned on the upper side of the mobile terminal 100 using the finger UF and insert the earphone into the main earphone jack EPJ2. The earphone may be inserted into the jack positioned on the upper side or the lower side of the mobile terminal 100, which depends on a selection of the user.

The user's touch input obtained through the display 151 may be transmitted to the controller 180. The controller 180 may cause each of the main earphone jack EPJ2 and the sub-earphone jack EPJ1 to be in one of the activated state and the inactivated state in response to the transmitted touch input of the user. In other words, the controller 180 may maintain or change a state of each of the main earphone jack EPJ2 and the sub-earphone jack EPJ1 in response to the user's touch input.

Figure 11:
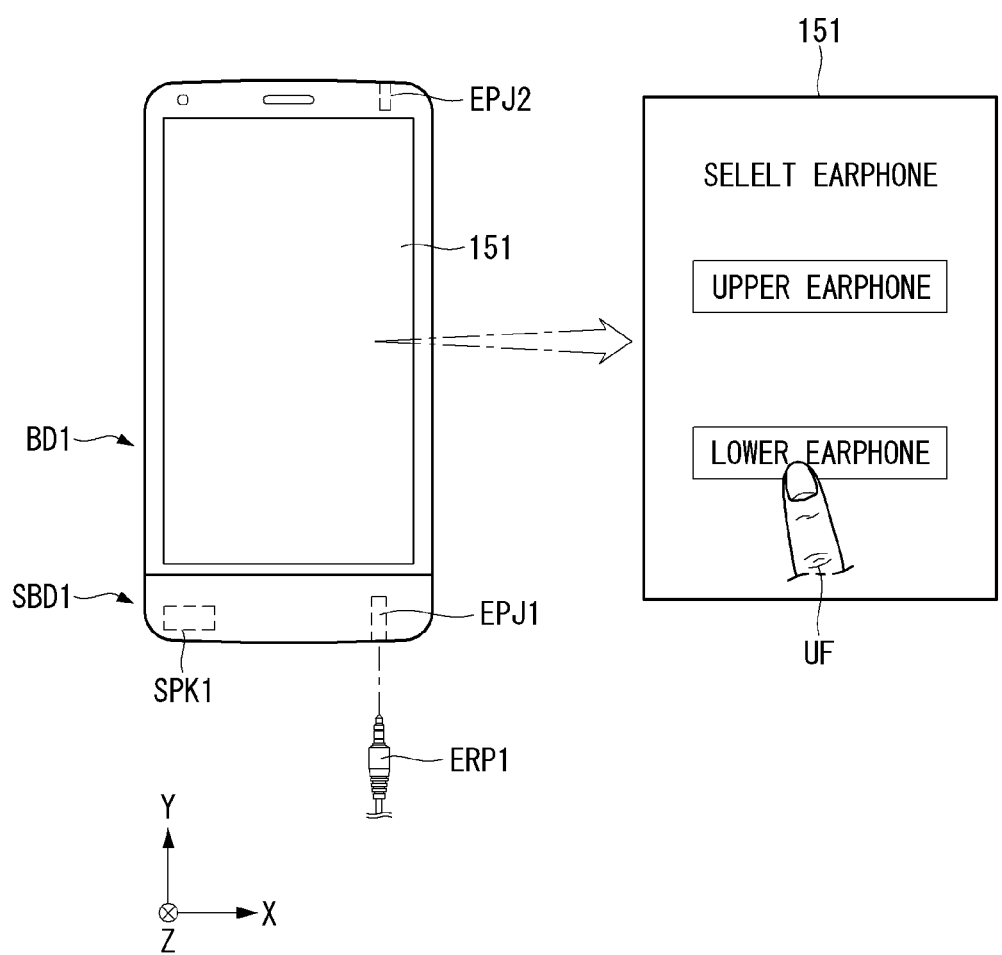
FIG. 11 illustrates an audio signal output path selected by a user among a main earphone jack and a sub-earphone jack according to an embodiment of the invention.

FIG. 11 illustrates an audio signal output path selected by a user among the main earphone jack and the sub-earphone jack according to the embodiment of the invention.

As shown in FIG. 11, the user may connect the earphone to one of the main earphone jack EPJ2 and the sub-earphone jack EPJ1 and may want to receive a sound. For example, the user may provide a touch input, which causes an audio signal to be output to the sub-earphone jack EPJ1 positioned on the lower side of the mobile terminal 100 as shown in FIG. 10, for the display 151.

The display 151 may receive the touch input from the user's finger UF and may transmit the touch input to the controller 180. The controller 180 may output the audio signal to the earphone jack corresponding to the transmitted touch input.

Selecting one of the main earphone jack EPJ2 and the sub-earphone jack EPJ1 may be performed on the assumption that both the main earphone jack EPJ2 and the sub-earphone jack EPJ1 are activated. The selection of the main earphone jack EPJ2 or the sub-earphone jack EPJ1 may depend on the user's selection. Further, the user may frequently change the earphone jack outputting the audio signal, if desired or necessary. For example, the user may select the main earphone jack EPJ2 and receive the sound through the main earphone jack EPJ2 while inserting the earphone into the sub-earphone jack EPJ1 to receive the sound.

FIGS. 12 to 15 illustrate a selection of an audio signal, that is output to the main earphone jack and the sub-earphone jack according to the embodiment of the invention.

In FIGS. 12 to 15, it may be assumed that first and second earphones ERP1 and ERP2 have been inserted or will be inserted into the main earphone jack EPJ2 and the sub-earphone jack EPJ1. Namely, in FIGS. 12 to 15, it may be assumed that a plurality of users receives a sound using the main earphone jack EPJ2 and the sub-earphone jack EPJ1.

As shown in FIGS. 12 to 15, the user may select an audio signal supplied to the main earphone jack EPJ2 and the sub-earphone jack EPJ1. The user may supply a touch input to the display 151 and select the audio signal supplied to the first and second earphones ERP1 and ERP2.

Figure 12:
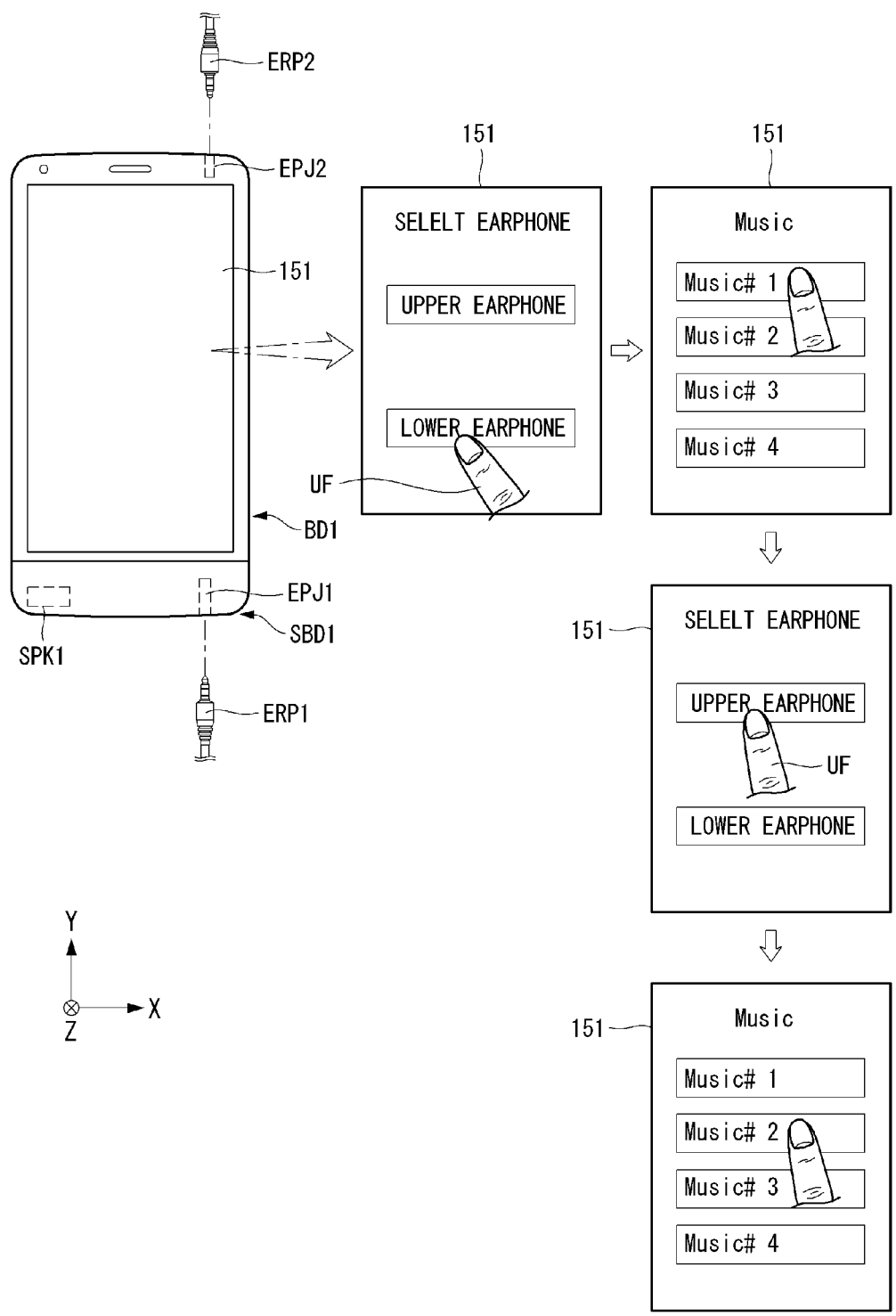
FIGS. 12 to 15 illustrate a selection of an audio signal output to a main earphone jack and a sub-earphone jack according to an embodiment of the invention.

As shown in FIG. 12, the user may select a first sound file music#1 as the audio signal provided for the sub-earphone jack EPJ1. Further, the user may select a second sound file music#2 as the audio signal provided for the main earphone jack EPJ2. In the embodiment disclosed herein, the audio signal may correspond to a sound content stored in the mobile terminal 100.

Figure 13:
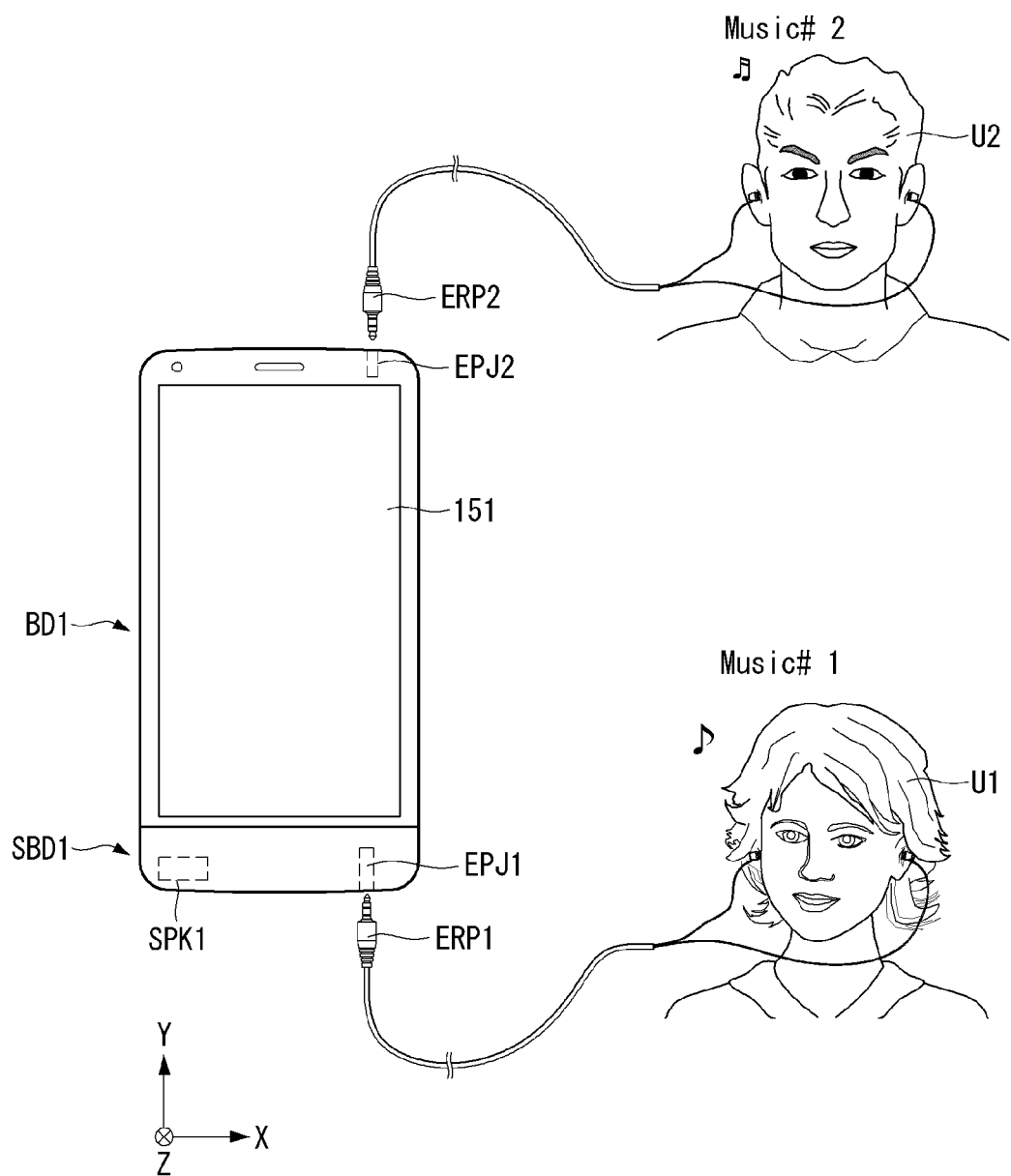

As shown in FIG. 13, the user may be a plurality of users, and the plurality of users may include a first user U1 and a second user U2. The first user U1 may insert the first earphone ERP1 into the sub-earphone jack EPJ1 and receive a sound through the first earphone ERP1. The second user U2 may insert the second earphone ERP2 into the main earphone jack EPJ2 and receive a sound through the second earphone ERP2.

Namely, the first user U1 may receive the sound from the first sound file music#1, and the second user U2 may receive the sound from the second sound file music#2. As described above, the different users may receive different sounds from one device, i.e., the mobile terminal 100.

Figure 14:
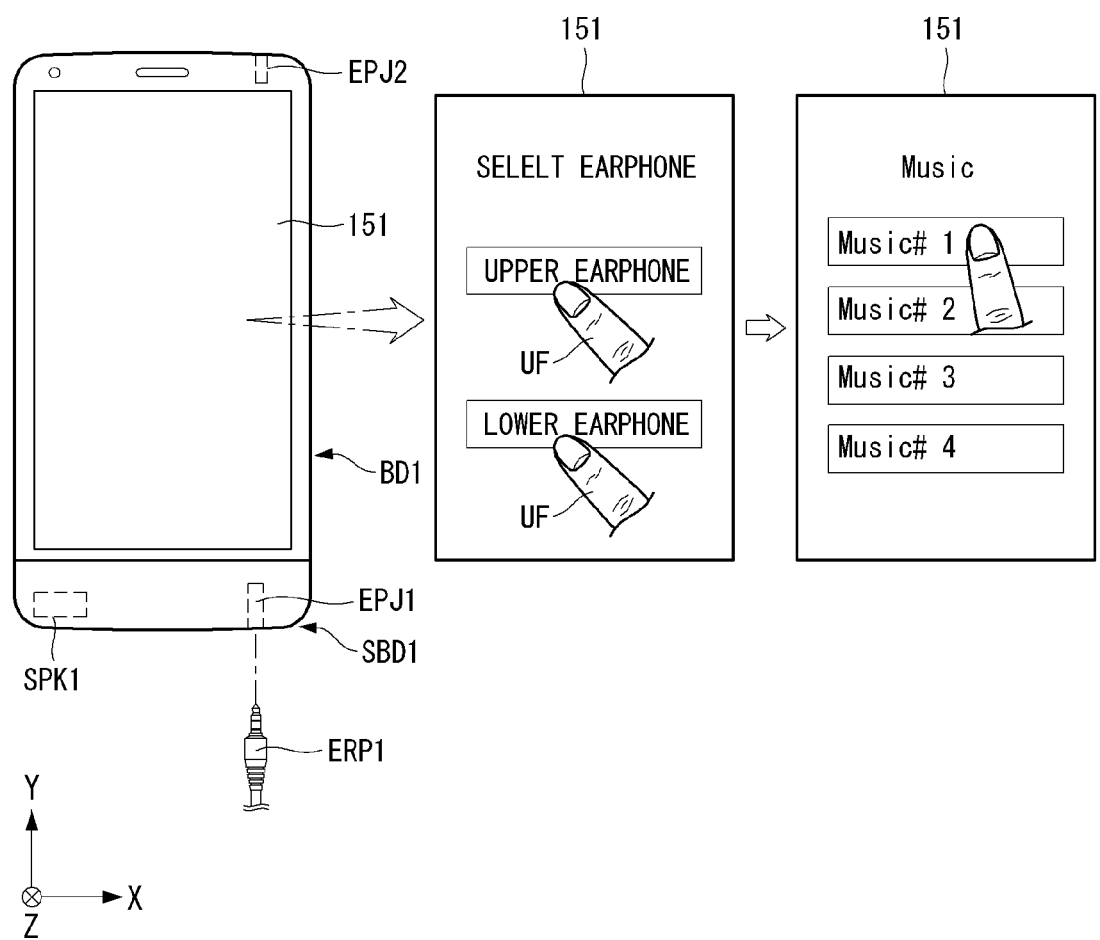
Figure 15:
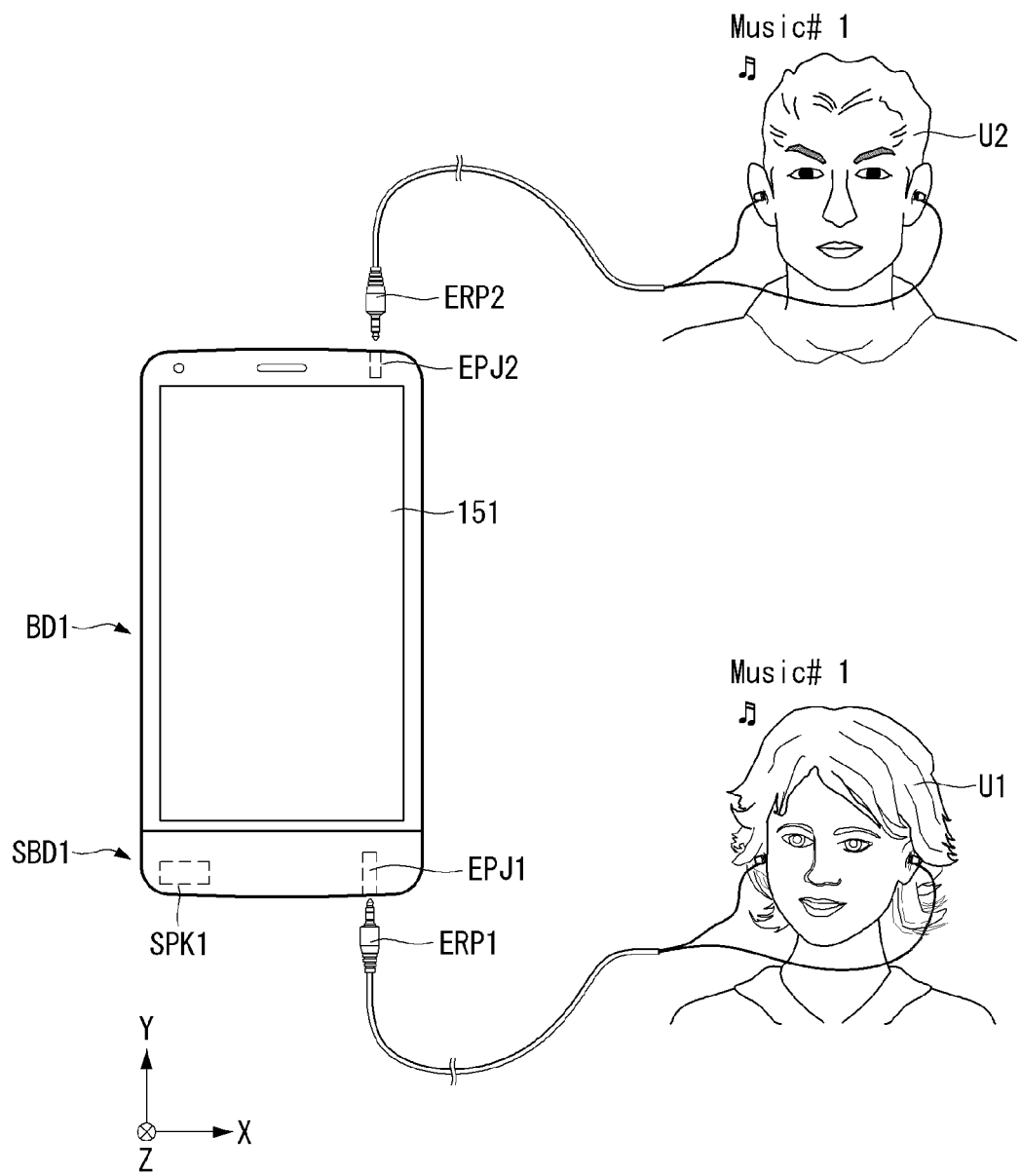

As shown in FIG. 14, the user may use the first sound file music#1 as sound files provided for both the main earphone jack EPJ2 and the sub-earphone jack EPJ1. FIG. 14 illustrates an example where the first and second users U1 and U2 want to receive the same sound. As shown in FIG. 15, both the first and second users U1 and U2 may receive the sound of the first sound file music#1.

Figure 16:
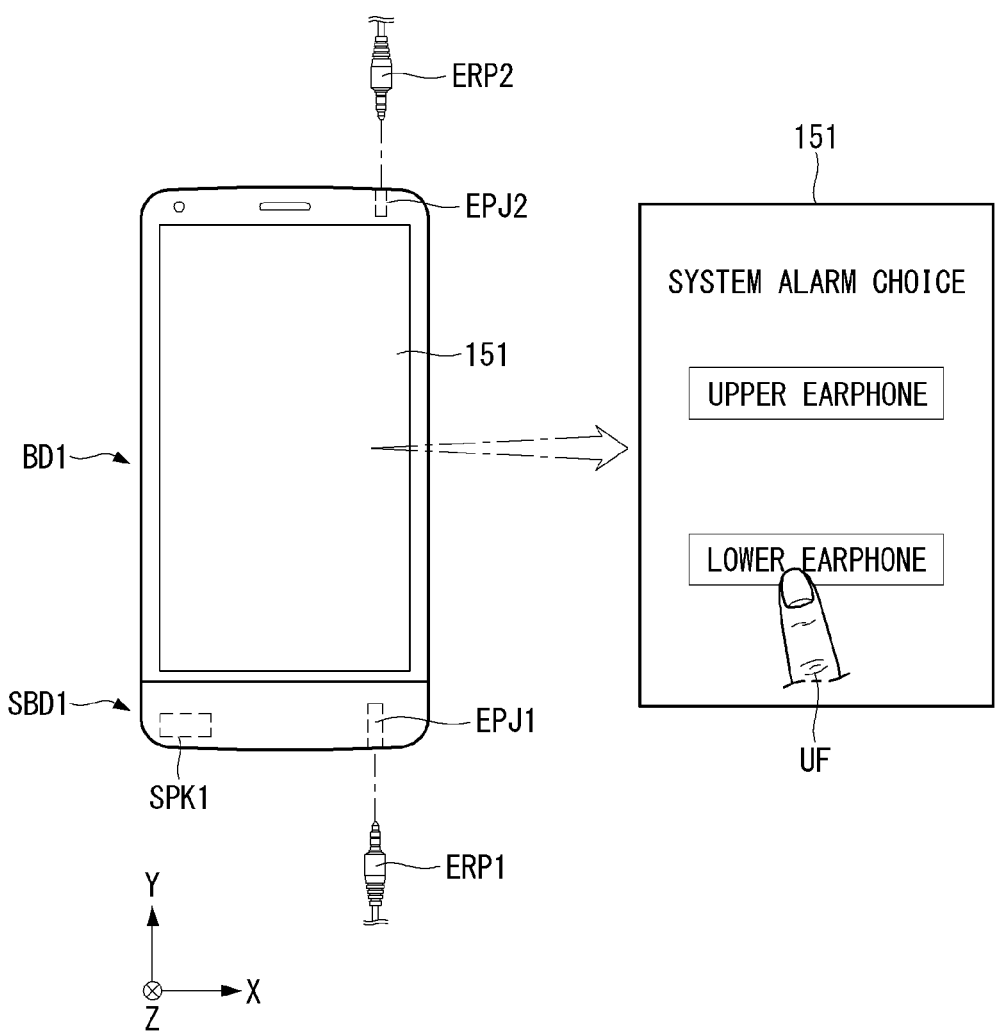
FIGS. 16 and 17 illustrate a selection of a transmitting path of status information of a mobile terminal according to an embodiment of the invention.
Figure 17:
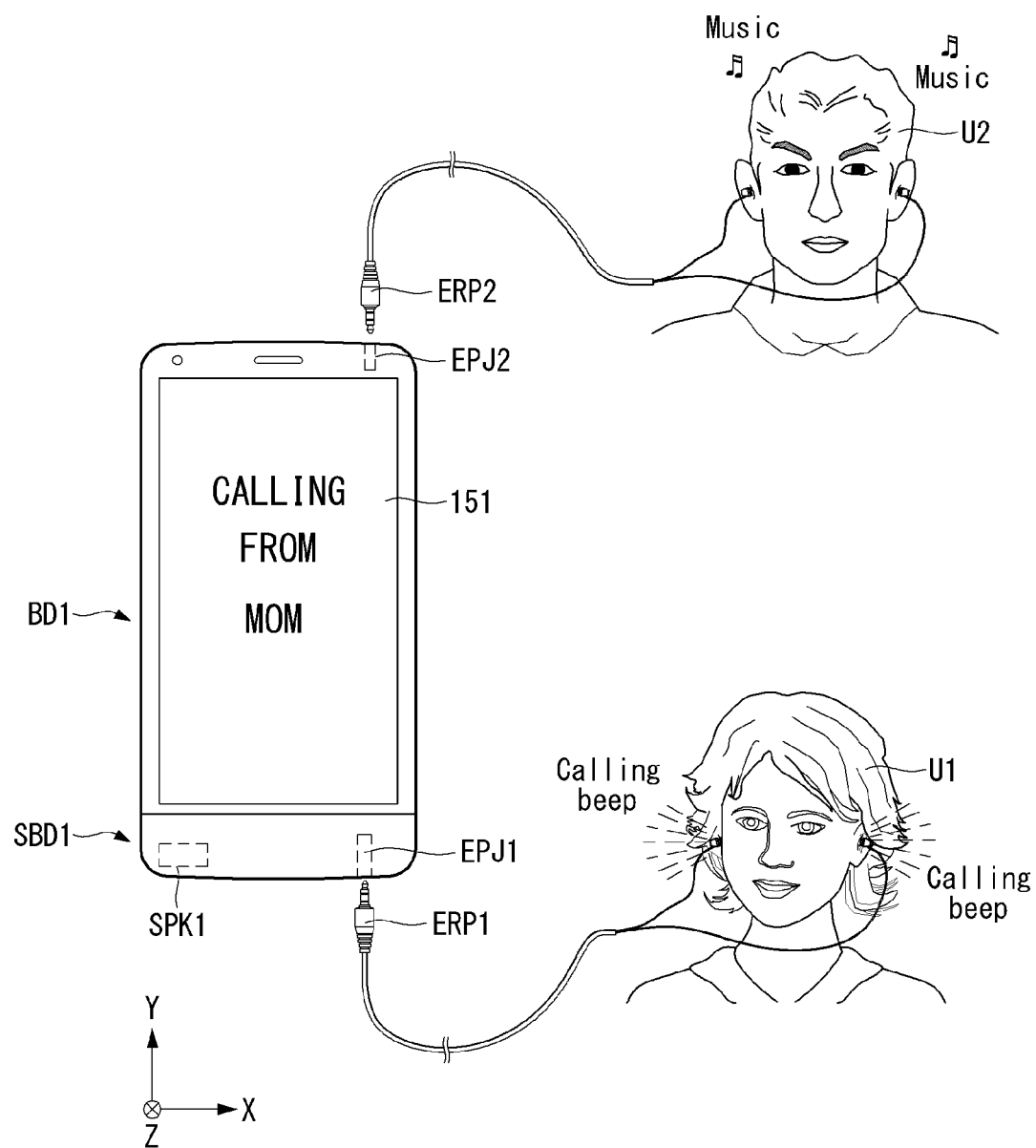

FIGS. 16 and 17 illustrate a selection of a transmitting path of status information of the mobile terminal according to the embodiment of the invention.

The mobile terminal 100 according to the embodiment of the invention may include the main earphone jack EPJ2 and the sub-earphone jack EPJ1. There may be first and second users U1 and U2 corresponding to the main earphone jack EPJ2 and the sub-earphone jack EPJ1, respectively. Only one of the first and second users U1 and U2 may control the mobile terminal 100.

It may be preferable, but not required, that an event signal of the mobile terminal 100 is transmitted to the user controlling the mobile terminal 100. Thus, it may be preferable, but not required, that an alarm and an event signal notifying a status of the mobile terminal 100 are output to one of the main earphone jack EPJ2 and the sub-earphone jack EPJ1. For example, an alarm event of the mobile terminal 100 may include a notification that the battery is low.

As shown in FIG. 16, the user may provide a touch input for the display 151 using the finger UF and output the event signal to the sub-earphone jack EPJ1.

When the event signal is output to the sub-earphone jack EPJ1, the first user U1 connecting the first earphone ERP1 to the sub-earphone jack EPJ1 may receive the event signal. In this instance, the first user U1 may substantially control the mobile terminal 100.

When the first and second users U1 and U2 receive a phone call on the mobile terminal 100 while listening to the music, it may be preferable, but not required, that the phone call is notified to the first user U1 substantially controlling the mobile terminal 100.

As shown in FIG. 17, when a phone call is received on the mobile terminal 100, the first user U1 may efficiently cope with a status of the mobile terminal 100 by receiving an alarm (for example, a calling beep) corresponding to an event signal of the mobile terminal 100. In this instance, the second user U2 may listen to the music regardless of the phone call received on the mobile terminal 100. Even if the first user U1 answers the phone, the controller 180 may continuously provide the audio signal for the main earphone jack EPJ2.

Figure 18:
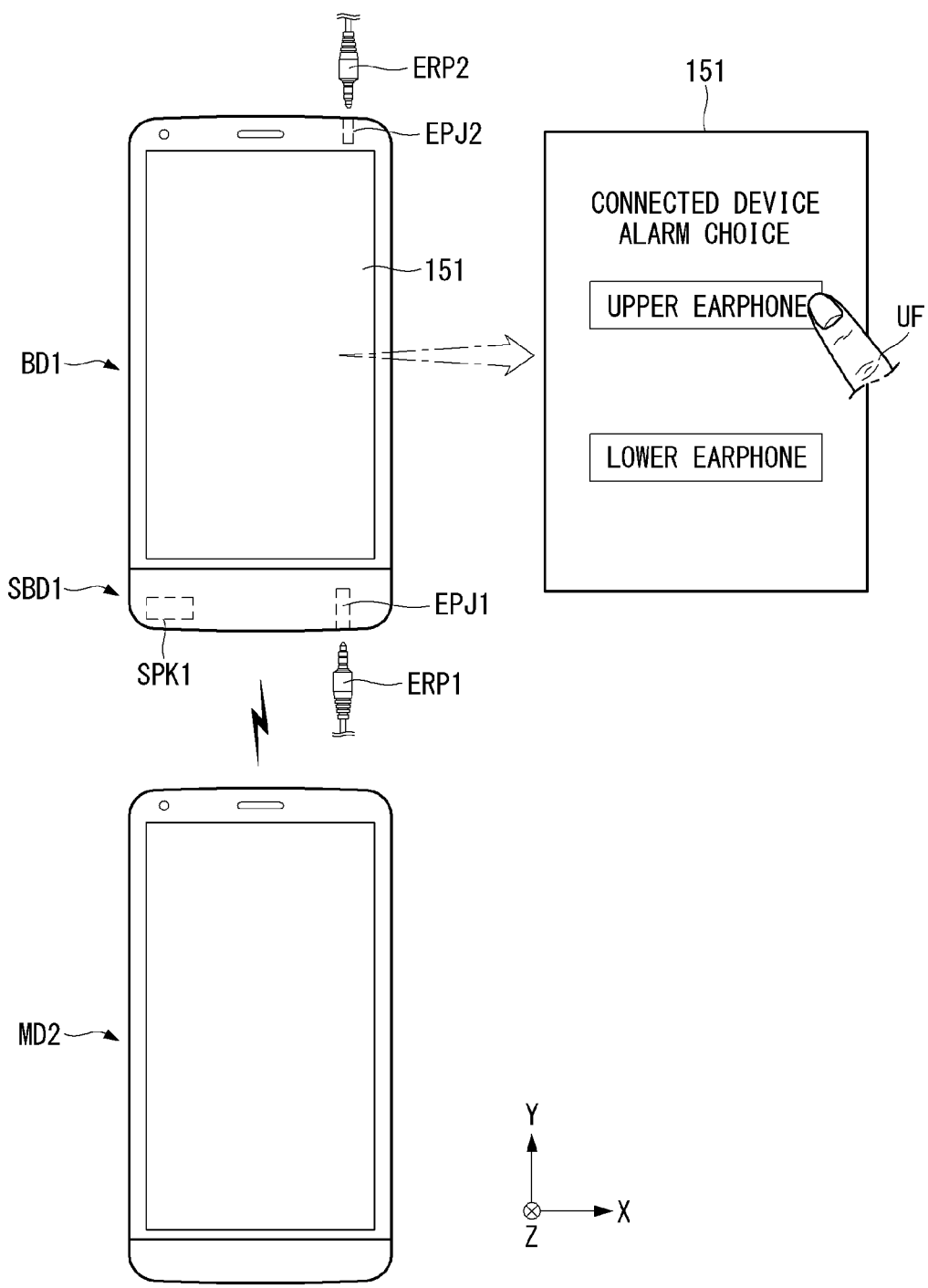
FIGS. 18 and 19 illustrate a communication between a mobile terminal according to an embodiment of the invention and another mobile terminal.
Figure 19:
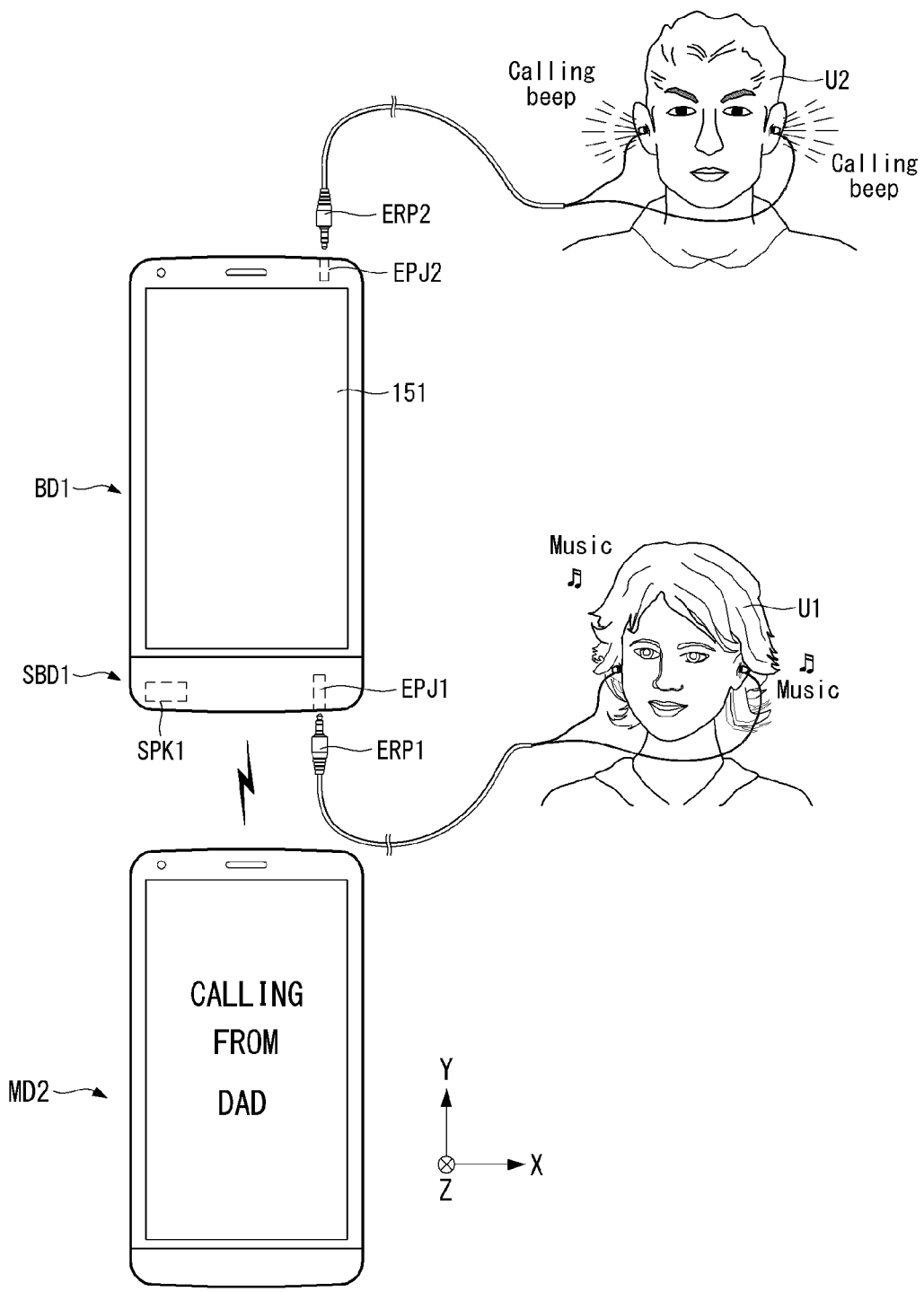

FIGS. 18 and 19 illustrate a communication between the mobile terminal according to the embodiment of the invention and another terminal.

An example where the first and second users U1 and U2 use the mobile terminal 100 according to the embodiment of the invention may be considered. In this instance, the first user U1 may be an owner of the mobile terminal 100 according to the embodiment of the invention and thus may substantially control the mobile terminal 100. The second user U2 may be an owner or a user of a second terminal MD2 different from the mobile terminal 100 of the first user U1. The second terminal MD2 may be included in a category of a mobile terminal. The second terminal MD2 may be another terminal different from the mobile terminal 100 according to the embodiment of the invention.

The mobile terminal 100 may communicate with the second terminal MD2. The second terminal MD2 may have the same performance as or a different performance from the mobile terminal 100 according to the embodiment of the invention. The mobile terminal 100 may communicate with the second terminal MD2 through Bluetooth manner. The second terminal MD2 may transmit status information of the second terminal MD2 to the mobile terminal 100.

The user may connect the second terminal MD2 to the mobile terminal 100 in a communication manner. The user may provide a touch input, which indicates the earphone jack to receive the status information of the second terminal MD2, for the display 155 using his/her finger UF. Namely, as shown in FIG. 18, the user may select the earphone jack and receive the status information of the second terminal MD2 connected to the mobile terminal 100 among the sub-earphone jack EPJ1 and the main earphone jack EPJ2.

In FIG. 18, 'UPPER EARPHONE' corresponds to the main earphone jack EPJ2, and 'LOWER EARPHONE' corresponds to the sub-earphone jack EPJ1. In FIG. 18, as the user touches 'UPPER EARPHONE' with his/her finger UF, the status information (or an alarm) of the second terminal MD2 may be transmitted to the main earphone jack EPJ2. Namely, when the user receives the touch input of selecting the main earphone jack EPJ2, the controller 180 may transmit an alarm notifying a status of the second terminal MD2 to the main earphone jack EPJ2.

As shown in FIG. 19, when the alarm notifying a status of the second terminal MD2 is transmitted to the main earphone jack EPJ2, the second user U2 may check the status of the second terminal MD2 through an audio signal. Namely, the second user U2 may confirm that a phone call is received on the second terminal MD2 of the second user U2, while listening to a sound file stored in the mobile terminal 100 of the first user U1. An alarm indicating that the phone call is received on the second terminal MD2 is not notified to the first user U1. Thus, the first user U1 may listen to the sound file stored in the mobile terminal 100 of the first user U1.

As described above, the audio signal provided for the first and second users U1 and U2 may be changed depending on a demand of the first and second users U1 and U2. For example, information about a status of the mobile terminal 100 owned by the first user U1 may be more necessary for the first user U1 than the second user U2. Thus, the information about the status of the mobile terminal 100 may be blocked from being provided for the second user U2 and may be provided for the first user U1.

As another example, information about a status of the second terminal MD2 owned by the second user U2 may be more necessary for the second user U2 than the first user U1. Thus, the information about the status of the second terminal MD2 may be blocked from being provided for the first user U1 and may be provided for the second user U2.

Figure 20:
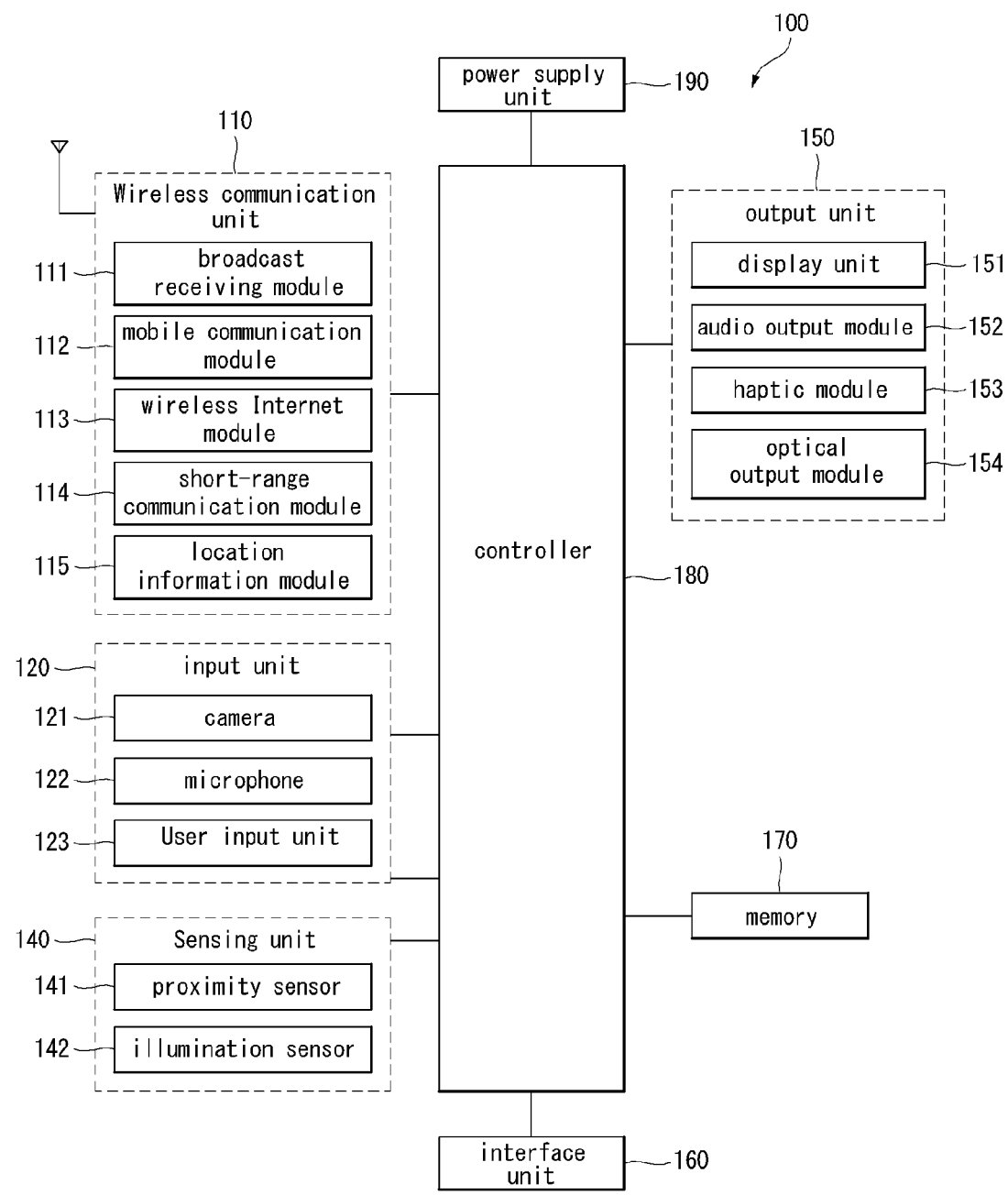
FIG. 20 is a block diagram illustrating a mobile terminal according to an embodiment of the invention.

FIG. 20 is a block diagram of the mobile terminal according to the embodiment of the invention. More specifically, FIG. 20 shows a wireless communication unit 110, an input unit 120, the sensing unit 140, an output unit 150, the interface unit 160, the memory 170, the controller 180, and the power supply unit 190 of the mobile terminal.

All of the components shown in FIG. 20 are not a requirement, and that greater or fewer components may be alternatively implemented.

Referring to FIG. 20, the mobile terminal 100 is shown having wireless communication unit 110 configured with several implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 20, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). The application programs can be stored in the memory 170, installed in the mobile terminal 100, and executed by the controller 180 to perform an operation (or function) for the mobile terminal 100.

The controller 180 controls overall operation of the mobile terminal 100, in addition to the operations associated with the application programs. The controller 180 can provide or process information or functions appropriate for a user by processing signals, data, information and the like, which are input or output by the various components depicted in FIG. 20, or activating application programs stored in the memory 170.

As one example, the controller 180 controls some or all of the components according to the execution of an application program stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a portion of the components illustrated in FIG. 20 may cooperatively operate to implement an operation, a control, or a control method of the mobile terminal 100 according to various embodiments of the invention that will be described below. The operation, the control, or the control method of the mobile terminal 100 may be implemented by the execution of at least one application program stored in the memory 170.

Figure 21:
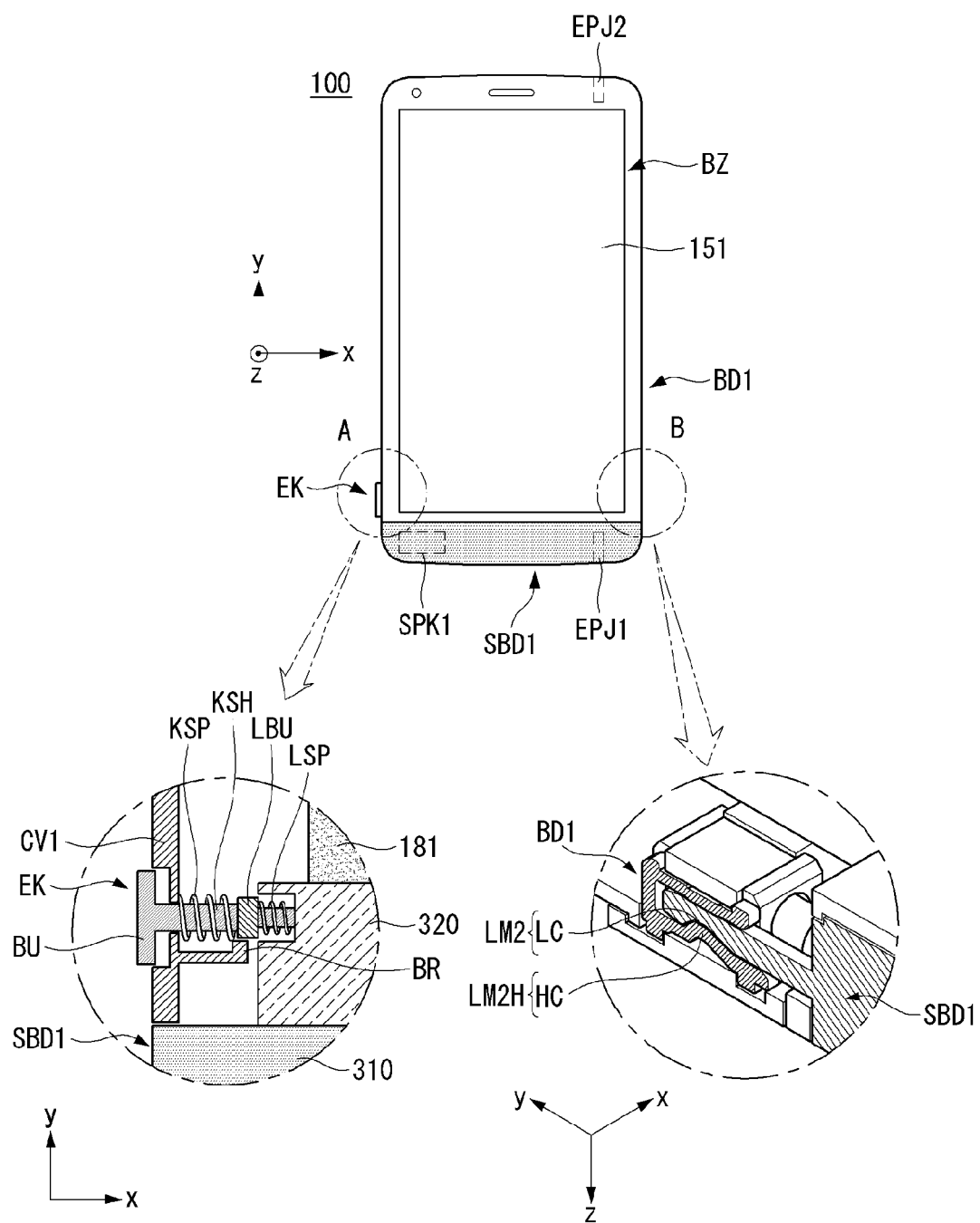
FIG. 21 illustrates a mobile terminal according to an embodiment of the invention.

FIG. 21 illustrates a mobile terminal according to an embodiment of the invention. The mobile terminal 100 may include a first body BD1 and a first audio signal processing body SBD1. The first body BD1 may be coupled with or separated from the first audio signal processing body SBD1. The first body BD1 may be positioned on the upper part, and the first audio signal processing body SBD1 may be positioned on the lower part.

The coupling and the separation between the first body BD1 and the first audio signal processing body SBD1 may be related to the battery change of the mobile terminal 100. A cover of the mobile terminal 100 may be formed as one body along with the first body BD1. In particular, when a back cover is formed of metal, the cover of the mobile terminal 100 may not be separated from the first body BD1. In this instance, in a related art, it was difficult to change the battery of the mobile terminal 100. However, in the mobile terminal 100 according to the embodiment of the invention, the battery may be connected to the first audio signal processing body SBD1. Therefore, in the mobile terminal 100 according to the embodiment of the invention, the battery can be changed.

The first body BD1 may include an opening on one side. The first body BD1 may include a display 151 and a main earphone jack EPJ2. The display 151 may be positioned at a front surface of the first body BD1. A bezel may be formed to surround the display 151.

The main earphone jack EPJ2 may be positioned on one side of the first body BD1. For example, the main earphone jack EPJ2 may be positioned on an upper side of the first body BD1. When a terminal of an earphone is inserted into the main earphone jack EPJ2, the main earphone jack EPJ2 may provide an audio signal for the earphone.

The first audio signal processing body SBD1 may include a sub-earphone jack EPJ1 and a first speaker SPK1. The first speaker SPK1 may radiate a sound to the outside. The sub-earphone jack EPJ1 may be formed on a lower part of the first audio signal processing body SBD1. When a terminal of an earphone is inserted into the sub-earphone jack EPJ1, the sub-earphone jack EPJ1 may provide an audio signal for the earphone. One end of the first audio signal processing body SBD1 may have a shape capable of being inserted into the opening of the first body BD1.

An emission key EK may be positioned on one side of the first body BD1. The emission key EK may be concerned in the coupling and the separation between the first body BD1 and the first audio signal processing body SBD1. In other words, the user may separate the first body BD1 from the first audio signal processing body SBD1 by operating the emission key EK.

The first audio signal processing body SBD1 may include a first locking module LM1 and a second locking module LM2. The first body BD1 according to the embodiment of the invention may include the emission key EK and a second locking module housing LM2H.

The emission key EK may include a button BU, a key shaft KSH, a key spring KSP, and a finger stop BR. The button BU may form a part exposed to the outside from the emission key EK and may be connected to the key shaft KSH. The button BU may receive a force from the outside and may transmit the force to the key shaft KSH.

At least a portion of the key shaft KSH may pass through a portion of a first cover CV1. The key shaft KSH may contact a locking button LBU. The key shaft KSH may transfer the force to the locking button LBU.

One end of the key spring KSP may be connected to the first cover CV1, and the other end of the key spring KSP may be connected to the key shaft KSH. The key spring KSP may provide an elastic force for the key shaft KSH.

The finger stop BR may be connected to the first cover CV1. The finger stop BR may be positioned inside the first cover CV1 and may be extended toward the inside of the first cover CV1. The finger stop BR may contact the locking button LBU.

The first locking module LM1 may include a locking button LBU, a locking shaft LSH, and a locking spring LSP. The locking button LBU may adjoin the key shaft KSH. The locking button LBU may be connected to the locking shaft LSH.

The locking shaft LSH may be connected to the locking button LBU. The locking shaft LSH may receive a force from the locking button LBU or may transfer the force to the locking button LBU. Namely, the locking button LBU may transfer the force received from the key shaft KSH to the locking shaft LSH, and the locking shaft LSH may transfer the force received from the locking spring LSP to the locking button LBU.

One end of the locking spring LSP may be connected to the locking shaft LSH, and the other end of the locking spring LSP may be connected to one side of a first audio signal processing body inner part 320. The locking spring LSP may provide an elastic force for the locking shaft LSH.

When the finger stop BR contacts the locking button LBU, the finger stop BR may be positioned on a path of the locking button LBU moving through an elastic force provided by a spring assembly. Thus, as shown in FIG. 21, when the finger stop BR contacts the locking button LBU, it may be difficult to downwardly (or in a negative direction of the y-axis) move the first audio signal processing body SBD1.

The second locking module LM2 may have a locking curved portion LC. The second locking module housing LM2H may have a housing curved portion HC.

The locking curved portion LC may be opposite the housing curved portion HC. A shape of the locking curved portion LC may correspond to a shape of the housing curved portion HC. For example, if the locking curved portion LC may have a convex shape protruding toward the housing curved portion HC, the housing curved portion HC may have a concave shape depressed toward the locking curved portion LC.

The locking curved portion LC may have a convex shape protruding toward the housing curved portion HC. The locking curved portion LC may have a concave shape depressed toward the housing curved portion HC. When the locking curved portion LC has the concave shape depressed toward the housing curved portion HC, a space may be saved.

The locking curved portion LC may be inserted into the housing curved portion HC. Namely, the second locking module LM2 may be inserted into the second locking module housing LM2H. As the locking curved portion LC is inserted into the housing curved portion HC, the first audio signal processing body SBD1 may not be separated from the first body BD1.

Figure 22:
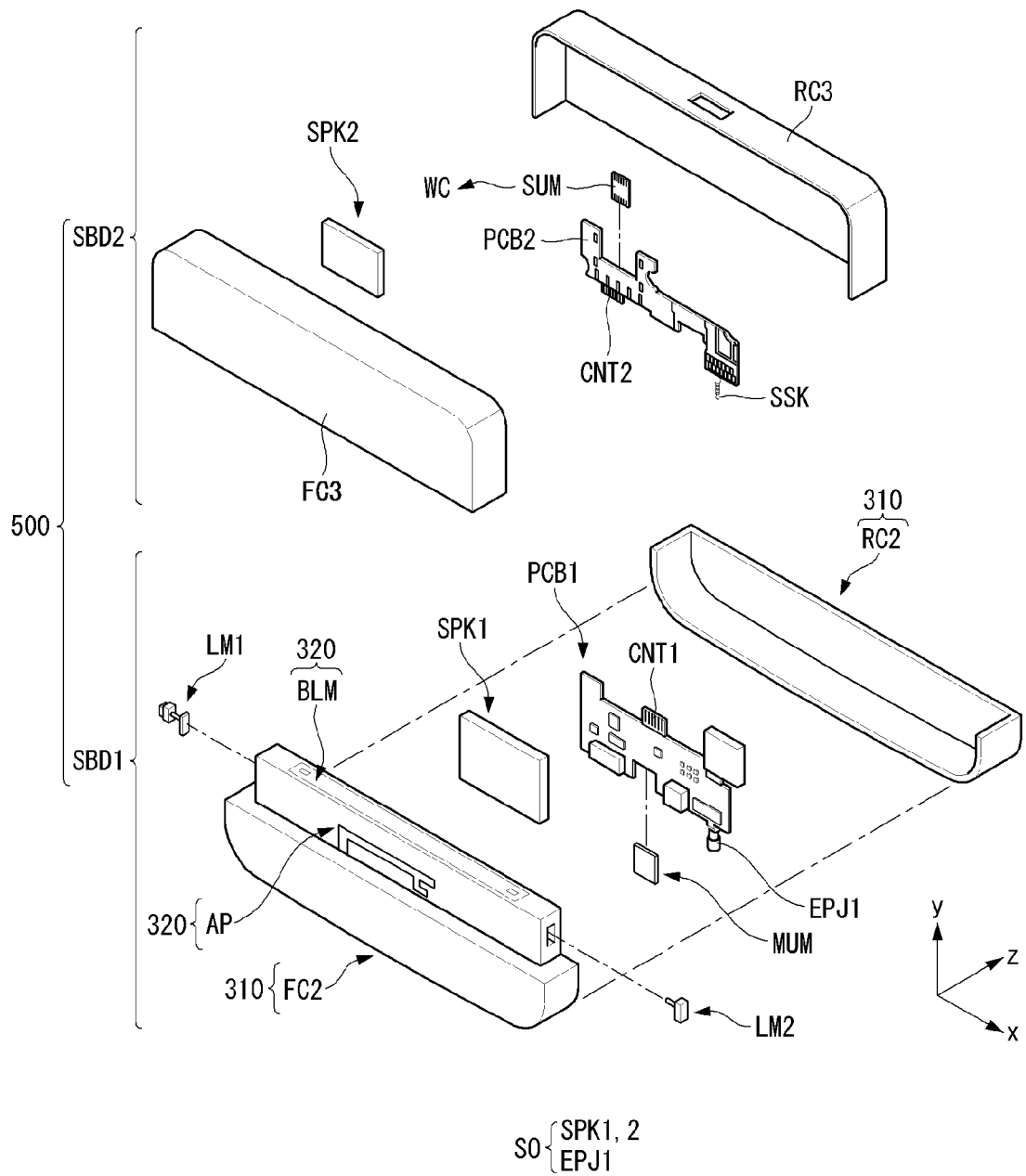
FIG. 22 is an exploded perspective view of an audio signal processing device according to an embodiment of the invention.

FIG. 22 is an exploded perspective view of an audio signal processing device according to an embodiment of the invention.

As shown in FIG. 22, an audio signal processing device 500 according to an embodiment of the invention may include a first audio signal processing body SBD1 and a second audio signal processing body SBD2.

The first audio signal processing body SBD1 according to the embodiment of the invention may include a first audio signal processing body outer part 310, a first audio signal processing body inner part 320, a first locking module LM1, a second locking module LM2, a first speaker SPK1, a first circuit board PCB1, and a main USB module MUM.

The first audio signal processing body outer part 310 may include a second front cover FC2 and a second back cover RC2. The second front cover FC2 may form a front surface of the first audio signal processing body outer part 310. The second back cover RC2 may form a back surface of the first audio signal processing body outer part 310.

The first audio signal processing body inner part 320 may include a battery locking module BLM and an antenna pattern AP. The battery locking module BLM may be connected to a battery.

The antenna pattern AP may be formed on an external surface of the first audio signal processing body inner part 320. The antenna pattern AP may be formed inside the first audio signal processing body inner part 320. The antenna pattern AP may be formed backwardly (or in a positive direction of the z-axis). Alternatively, the antenna pattern AP may be may be formed forwardly (or in a negative direction of the z-axis).

The antenna pattern AP may convert an electric signal into an electromagnetic wave or covert the electromagnetic wave into the electric signal. The antenna pattern AP may be connected to the first circuit board PCB1. The antenna pattern AP may be used in wireless communication. The antenna pattern AP may be used in near field communication. For example, the antenna pattern AP may be used in wireless communication of Bluetooth manner.

The first locking module LM1 may be positioned on one side of the first audio signal processing body inner part 320. A button (not shown) may be formed on the second audio signal processing body SBD2 at a location corresponding to the first locking module LM1. A coupling strength between the first locking module LM1 and on the second audio signal processing body SBD2 may be determined depending on a strength pressing the button of the second audio signal processing body SBD2.

The second locking module LM2 may be positioned one side of the first audio signal processing body inner part 320. A housing (not shown) may be formed on the second audio signal processing body SBD2 at a location corresponding to the second locking module LM2. The housing of the second audio signal processing body SBD2 may be coupled with or separated from the second locking module LM2.

The battery locking module BLM may be positioned on an upper surface of the first audio signal processing body inner part 320. The battery locking module BLM may be positioned in a coupling hole of the upper surface of the first audio signal processing body inner part 320. The coupling hole may be a portion depressed to the inside of the first audio signal processing body inner part 320. Namely, the battery locking module BLM may be positioned inside the coupling hole, so that the battery locking module BLM is not exposed to the outside.

The first speaker SPK1 may be positioned between the second front cover FC2 and the second back cover RC2. The first speaker SPK1 may provide sound or voice information for the user. The first speaker SPK1 may be connected to the first circuit board PCB1.

The first circuit board PCB1 may be positioned between the second front cover FC2 and the second back cover RC2. The first circuit board PCB1 may be connected to the first speaker SPK1, the main USB module MUM, the antenna pattern AP, and the like. The first circuit board PCB1 may transmit and receive the electrical signal to or from the first speaker SPK1, the main USB module MUM, the antenna pattern AP, and the like. In this instance, a sub-sound module may be mounted on the first circuit board PCB1.

The sub-sound module may convert a digital audio signal into an analog audio signal. In the audio signal processing device 500 according to the embodiment of the invention, the first audio signal processing body SBD1 may process the sound. The first audio signal processing body SBD1 may change a mode depending on a method for receiving the digital audio signal. The first audio signal processing body SBD1 may be in one of first, second, and third processing modes.

In the first processing mode, the first audio signal processing body SBD1 may be coupled with a portion of other mobile terminal and may receive a digital audio signal. For example, the portion of the other mobile terminal may be the first body BD1 shown in FIG. 4. In other words, a main circuit board included in the first body BD1 may supply the digital audio signal to the first circuit board PCB1. The sub-sound module mounted on the first circuit board PCB1 may convert the digital audio signal into an analog audio signal.

In the second processing mode, the first audio signal processing body SBD1 may wirelessly receive a digital audio signal from other mobile terminal. For example, the other mobile terminal may be the mobile terminal 100 shown in FIG. 1. In other words, the mobile terminal 100 shown in FIG. 1 may supply the digital audio signal to the first audio signal processing body SBD1 in wireless communication.

In the third processing mode, the first audio signal processing body SBD1 may wired receive a digital audio signal from other mobile terminal. The second audio signal processing body SBD2 may be connected to the other mobile terminal. The second audio signal processing body SBD2 may include a sub-USB module SUM and a second connector CNT2. The first audio signal processing body SBD1 may include a first connector CNT1. The digital audio signal may be transmitted to the first circuit board PCB1 sequentially via the other mobile terminal, the sub-USB module SUM, the second connector CNT2, and the first connector CNT1. The digital audio signal transmitted to the first circuit board PCB1 may be converted into an analog audio signal.

The first circuit board PCB1 may exchange a signal for a second circuit board PCB2 embedded in the second audio signal processing body SBD2. Namely, a path for transmitting an electric signal between the first circuit board PCB1 and the second circuit board PCB2 may be formed. The first audio signal processing body SBD1 may include the first connector CNT1, so as to form the path for the electric signal. The first connector CNT1 may be electrically connected to the second connector CNT2 included in the second audio signal processing body SBD2 in a state where the first audio signal processing body SBD1 is coupled with the second audio signal processing body SBD2. In other words, the first connector CNT1 and the second connector CNT2 may be used in the path for transmitting the electric signal between the first circuit board PCB1 and the second circuit board PCB2.

The main USB module MUM may be positioned between the second front cover FC2 and the second back cover RC2. The main USB module MUM may be connected to an external USB. In other words, the audio signal processing device 500 may USB-communicate with other mobile terminal through the main USB module MUM.

The second audio signal processing body SBD2 may include a third front cover FC3 and a third back cover RC3. The third front cover FC3 may form a front surface of the second audio signal processing body SBD2. The third front cover FC3 and the second front cover FC2 may form a front surface of the audio signal processing device 500. The third back cover RC3 may form a back surface of the second audio signal processing body SBD2. The third back cover RC3 may form a back surface of the audio signal processing device 500.

The second audio signal processing body SBD2 may include the second circuit board PCB2, the sub-USB module SUM, the second connector CNT2, a second speaker SPK2, and a speaker earphone terminal SSK.

The second circuit board PCB2 may be positioned between the third front cover FC3 and the third back cover RC3. The second circuit board PCB2 may process an electrical signal. The second circuit board PCB2 may be electrically connected to the sub-USB module SUM, the second connector CNT2, the second speaker SPK2, and the speaker earphone terminal SSK.

The sub-USB module SUM may communicate with an external USB. The sub-USB module SUM may transmit and receive the electrical signal to and from other mobile terminal. For example, the sub-USB module SUM may be connected to the other mobile terminal. Hence, the sub-USB module SUM may receive the digital audio signal and transmit the digital audio signal to the second circuit board PCB2. The sub-USB module SUM may be one of female and male sub-USB modules. The sub-USB module SUM may be included in a wired connector WC.

The wired connector WC may be included in the second audio signal processing body SBD2. The wired connector WC may be wired connected to an external terminal and input and output information to the external terminal. For example, information using the wired connector WC may include an electrical signal or an optical signal. The wired connector WC may include a terminal capable of performing optical communication. The wired connector WC may include a terminal capable of transmitting and receiving the electrical signal. For example, the wired connector WC may include the sub-USB module SUM.

The second speaker SPK2 may radiate sound to the outside. The second speaker SPK2 may receive the analog audio signal from the second circuit board PCB2 and provide the sound. The second speaker SPK2 may receive the analog audio signal from the speaker earphone terminal SSK and produce the sound.

The first and second speakers SPK1 and SPK2 and a sub-earphone jack EPJ1 may be included in a sound output unit SO. The sound output unit SO may receive the analog audio signal. The first and second speakers SPK1 and SPK2 included in the sound output unit SO may receive the analog audio signal and convert the analog audio signal into sound. The sub-earphone jack EPJ1 included in the sound output unit SO may receive the analog audio signal and transmit the analog audio signal to an earphone inserted into the sub-earphone jack EPJ1.

Figure 23:
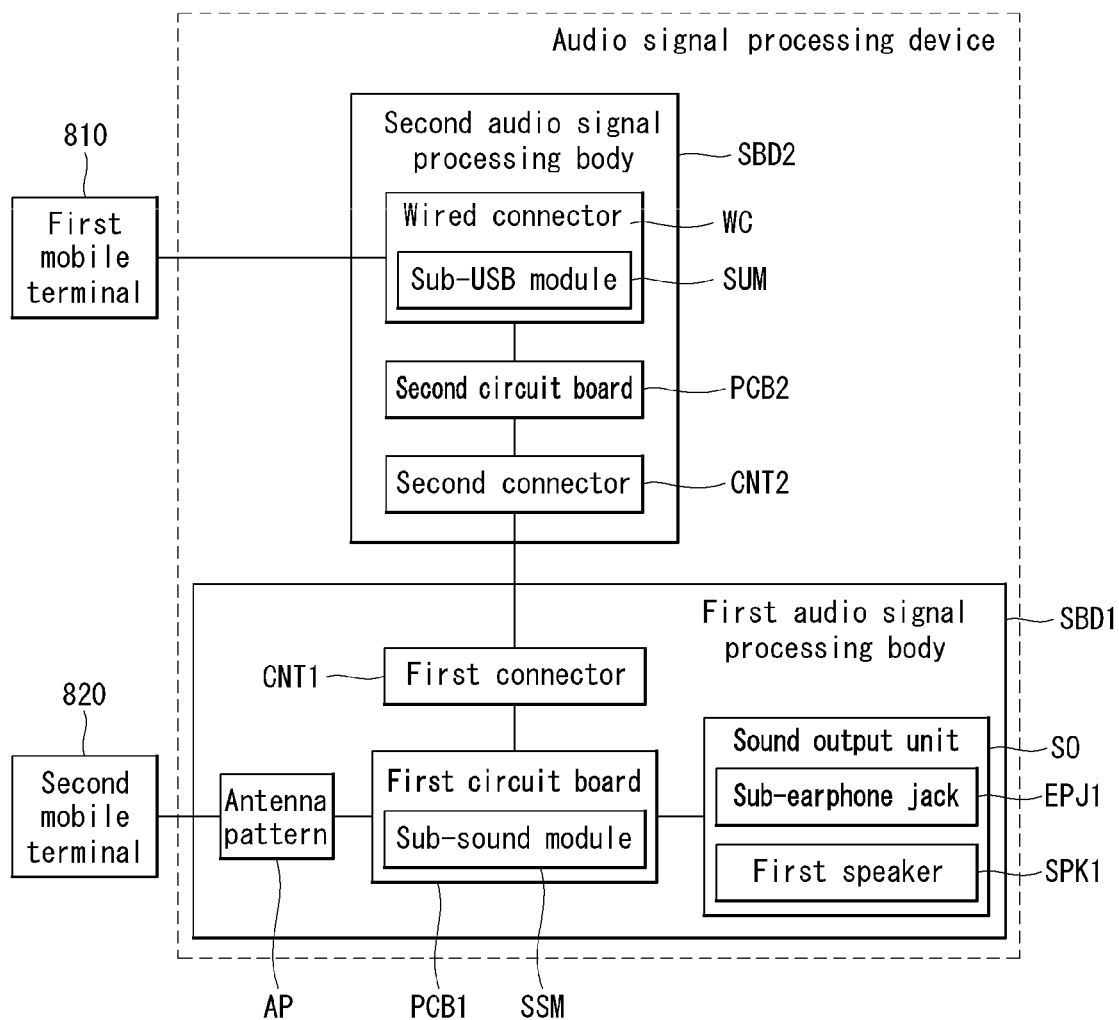
FIG. 23 is a block diagram of an audio signal processing device according to an embodiment of the invention.

FIG. 23 is a block diagram of an audio signal processing device according to an embodiment of the invention. As shown in FIG. 23, an audio signal processing device 500 according to the embodiment of the invention may include a first audio signal processing body SBD1 and a second audio signal processing body SBD2.

The first audio signal processing body SBD1 may include a first circuit board PCB1, an antenna pattern AP, a sound output unit SO, and a first connector CNT1. The antenna pattern AP, the sound output unit SO, and the first connector CNT1 may be connected to the first circuit board PCB1.

The antenna pattern AP may convert an electric signal into an electromagnetic wave or covert the electromagnetic wave into the electric signal. The antenna pattern AP may communicate with an external terminal. For example, the antenna pattern AP may communicate with a second mobile terminal 820. In other words, the first audio signal processing body SBD1 may wirelessly communicate with the second mobile terminal 820 using the antenna pattern AP. For example, the first audio signal processing body SBD1 may receive a digital audio signal from the second mobile terminal 820 through Bluetooth communication.

The first connector CNT1 may be connected to the second audio signal processing body SBD2. The first connector CNT1 may receive a digital audio signal from the second audio signal processing body SBD2. The first connector CNT1 may transmit the received digital audio signal to the first circuit board PCB1.

The first circuit board PCB1 may process a signal. The first circuit board PCB1 may include a sub-sound module SSM. The sub-sound module SSM may convert a digital audio signal into an analog audio signal. For example, the sub-sound module SSM may be a digital-to-analog converter (DAC). The sub-sound module SSM may amplify the analog audio signal after converting the digital audio signal into the analog audio signal. The sub-sound module SSM may supply the analog audio signal to the sound output unit SO.

The sound output unit SO may receive the analog audio signal. The sound output unit SO may include a sub-earphone jack EPJ1. The sub-earphone jack EPJ1 may transmit the analog audio signal to an earphone inserted into the sub-earphone jack EPJ1 or another speaker. The sound output unit SO may include a first speaker SPK1. The first speaker SPK1 may receive the analog audio signal and produce sound.

A process for outputting the audio signal received from the second mobile terminal 820 as sound is described. The digital audio signal may be wirelessly transmitted from the second mobile terminal 820 to the antenna pattern AP. The digital audio signal transmitted to the antenna pattern AP may be transmitted to the first circuit board PCB1. The digital audio signal transmitted to the first circuit board PCB1 may be transmitted to the sub-sound module SSM. The sub-sound module SSM may convert the digital audio signal into an analog audio signal. The sub-sound module SSM may transmit the analog audio signal to the sound output unit SO. The sound output unit SO may transmit the analog audio signal to an external speaker or convert the analog audio signal into sound.

The second audio signal processing body SBD2 may include a wired connector WC, a second circuit board PCB2, and a second connector CNT2. The wired connector WC and the second connector CNT2 may be connected to the second circuit board PCB2.

The wired connector WC may wired transmit and receive information to and from an external mobile terminal. For example, the wired connector WC may be wired connected to a first mobile terminal 810. The wired connector WC may include a sub-USB module SUM. The sub-USB module SUM may perform communication of a USB manner. The second connector CNT2 may be connected to the first audio signal processing body SBD1 and may transmit and receive information to and from the first audio signal processing body SBD1.

A process for outputting an audio signal received from the first mobile terminal 810 as sound is described. A digital audio signal may be wired transmitted from the first mobile terminal 810 to the wired connector WC. The digital audio signal transmitted to the wired connector WC may be transmitted to the first circuit board PCB1 through the second circuit board PCB2, the second connector CNT2, and the first connector CNT1. The digital audio signal transmitted to the first circuit board PCB1 may be transmitted to the sub-sound module SSM. The sub-sound module SSM may convert the digital audio signal into an analog audio signal. The sub-sound module SSM may transmit the analog audio signal to the sound output unit SO. The sound output unit SO may transmit the analog audio signal to an external speaker or convert the analog audio signal into sound.

Figure 24:
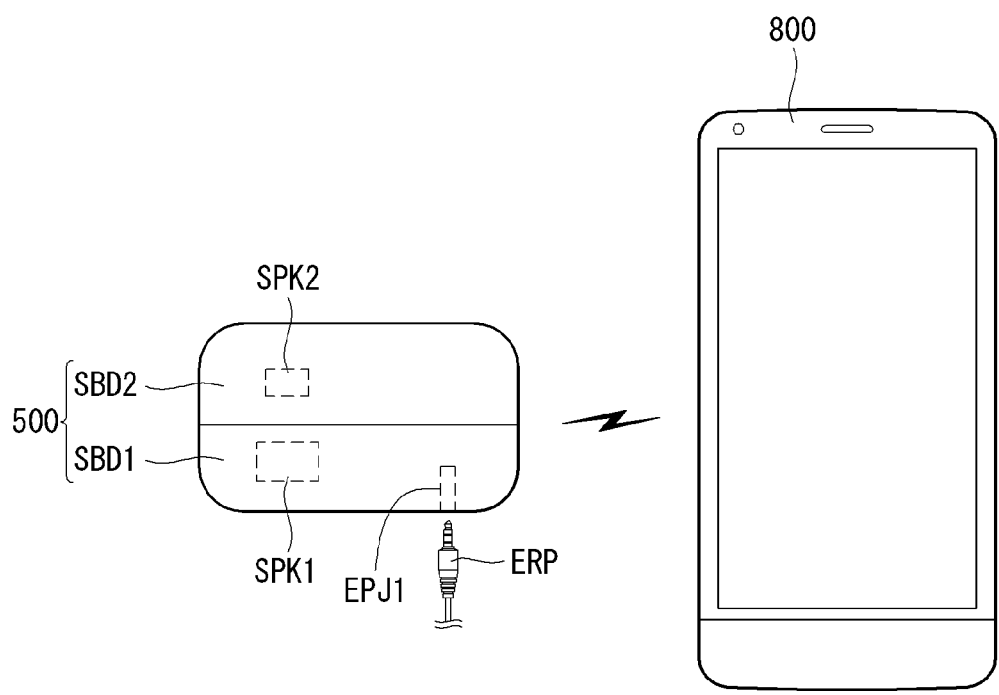
FIGS. 24 and 25 illustrate a connection between an audio signal processing device according to an embodiment of the invention and a mobile terminal.
Figure 25:
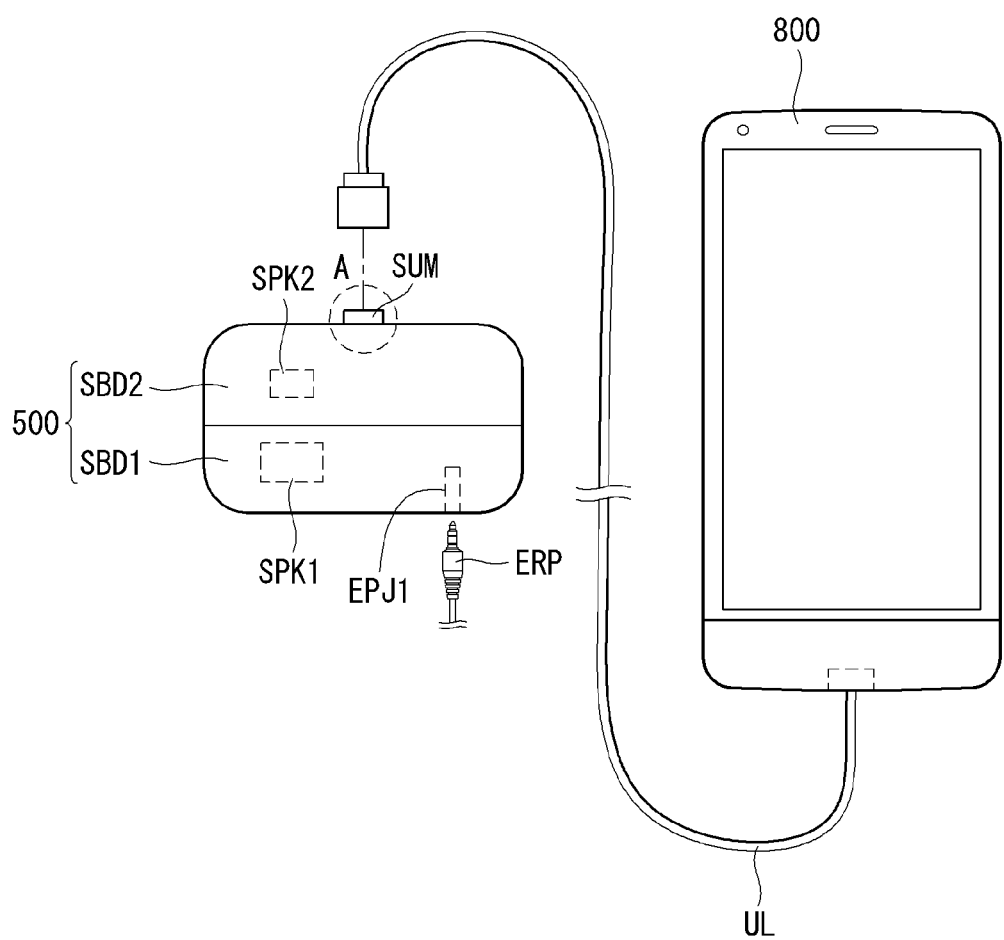

FIGS. 24 and 25 illustrate a connection between an audio signal processing device according to an embodiment of the invention and a mobile terminal.

FIG. 24 illustrates wireless communication between an audio signal processing device 500 according to the embodiment of the invention and a mobile terminal 800. In the embodiment disclosed herein, the wireless communication may use Bluetooth manner, for example. When the wireless communication between the audio signal processing device 500 and the mobile terminal 800 is possible, the user may freely set a location of the audio signal processing device 500 within a predetermined range.

A first audio signal processing body SBD1 may convert a digital audio signal into an analog audio signal. When the analog audio signal is supplied to a speaker, the speaker may radiate sound to the outside. As shown in FIG. 24, the first audio signal processing body SBD1 may be in a second processing mode. In other words, the first audio signal processing body SBD1 may wirelessly receive the digital audio signal from other mobile terminal 800 and convert the digital audio signal into the digital audio signal.

The first audio signal processing body SBD1 may include first and second speakers SPK1 and SPK2 and a sub-earphone jack EPJ1. The first and second speakers SPK1 and SPK2 may receive the analog audio signal and irradiate sound to the outside. The sub-earphone jack EPJ1 may receive the analog audio signal and supply the analog audio signal to an earphone ERP inserted into the sub-earphone jack EPJ1. The earphone ERP inserted into the sub-earphone jack EPJ1 may receive the analog audio signal and irradiate sound to the outside.

FIG. 25 illustrates wired communication between the audio signal processing device 500 according to the embodiment of the invention and the mobile terminal 800. In the embodiment disclosed herein, the wired communication may use a USB manner or an optical manner, for example. When the wired communication between the audio signal processing device 500 and the mobile terminal 800 is possible, the digital audio signal may be stably transmitted from the mobile terminal 800 to the audio signal processing device 500.

As shown in FIG. 25, the first audio signal processing body SBD1 may be in a third processing mode. In other words, the first audio signal processing body SBD1 may wired receive a digital audio signal from other mobile terminal 800 and convert the digital audio signal into an analog audio signal.

The first audio signal processing body SBD1 may receive a digital audio signal from other mobile terminal 800 through a second audio signal processing body SBD2. As shown in FIG. 25, the second audio signal processing body SBD2 may be connected to the mobile terminal 800. A USB line UL may connect the mobile terminal 800 to the second audio signal processing body SBD2. The USB line UL may transmit the digital audio signal from the mobile terminal 800 to the second audio signal processing body SBD2. The second audio signal processing body SBD2 may include a sub-USB module SUM on its one side.

A transmission flow of the digital audio signal is described. The digital audio signal may reach the first audio signal processing body SBD1 sequentially via the mobile terminal 800, the USB line UL, and the second audio signal processing body SBD2. The digital audio signal reaching the first audio signal processing body SBD1 may be converted into an analog audio signal. The analog audio signal may be output to the first and second speakers SPK1 and SPK2 or the sub-earphone jack EPJ1.

Figure 26:
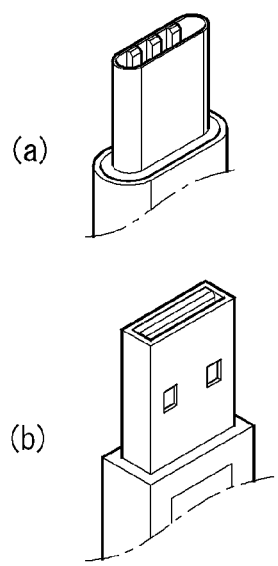
FIG. 26 illustrates a sub-USB module shown in FIG. 25.

FIG. 26 illustrates a sub-USB module shown in FIG. 25. More specifically, FIG. 26 illustrates a portion 'A' shown in FIG. 25.

As shown in (a) of FIG. 26, the sub-USB module SUM according to the embodiment of the invention may use a C-type USB manner. The sub-USB module SUM may protrude to the outside. The sub-USB module SUM may protrude to the outside for user convenience, if necessary or desired.

As shown in (b) of FIG. 26, the sub-USB module SUM according to the embodiment of the invention may use an A-type USB manner. The A-type USB and the C-type USB are compatible with each other using a USB gender changer.

Figure 27:
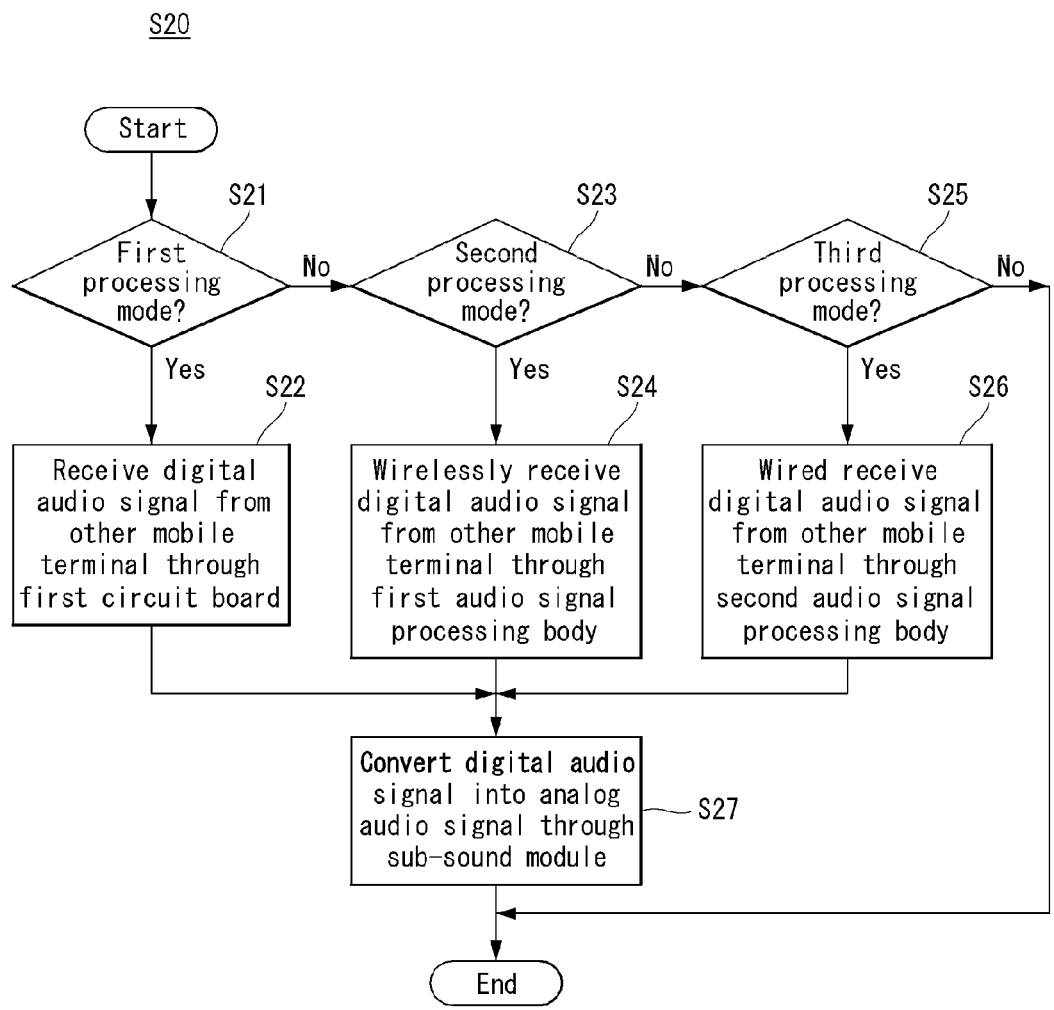
FIG. 27 is a flow chart illustrating a digital audio signal processing method of an audio signal processing device according to an embodiment of the invention.

FIG. 27 is a flow chart illustrating a digital audio signal processing method of an audio signal processing device according to an embodiment of the invention.

A digital audio signal processing method S20 of an audio signal processing device 500 may include a step S21 of determining whether or not the first audio signal processing body SBD1 is in the first processing mode. When the first audio signal processing body SBD1 is in the first processing mode, it may mean that the first audio signal processing body SBD1 is coupled with a portion of other mobile terminal.

The digital audio signal processing method S20 of the audio signal processing device 500 may include a step S22 of receiving a digital audio signal from a portion of the other mobile terminal through the first circuit board PCB1.

The digital audio signal processing method S20 of the audio signal processing device 500 may include a step S27 of converting the digital audio signal into an analog audio signal through the sub-sound module. The analog audio signal may be output to the speaker or the earphone jack. When the first audio signal processing body SBD1 is not in the first processing mode, the processing mode of the first audio signal processing body SBD1 may need to be checked.

The digital audio signal processing method S20 of the audio signal processing device 500 may include a step S23 of determining whether or not the first audio signal processing body SBD1 is in the second processing mode. When the first audio signal processing body SBD1 is in the second processing mode, it may mean that the first audio signal processing body SBD1 wirelessly communicates with an external mobile terminal.

The digital audio signal processing method S20 of the audio signal processing device 500 may include a step S24 of wirelessly receiving a digital audio signal from other mobile terminal through the first audio signal processing body SBD1. Because the first audio signal processing body SBD1 includes the antenna pattern, the first audio signal processing body SBD1 may wirelessly communicate with the external mobile terminal. When the first audio signal processing body SBD1 is not in the first and second processing modes, whether or not the first audio signal processing body SBD1 is in the third processing mode may need to be checked.

The digital audio signal processing method S20 of the audio signal processing device 500 may include a step S25 of determining whether or not the first audio signal processing body SBD1 is in the third processing mode. When the first audio signal processing body SBD1 is in the third processing mode, it may mean that the first audio signal processing body SBD1 wirelessly communicates with an external mobile terminal.

The digital audio signal processing method S20 of the audio signal processing device 500 may include a step S26 of wired receiving a digital audio signal from other mobile terminal through the second audio signal processing body SBD2. The digital audio signal received by the second audio signal processing body SBD2 may be transmitted to the first audio signal processing body SBD1.

The foregoing embodiments are merely examples and are not to be considered as limiting the present disclosure. The present teachings can be readily applied to other types of methods and devices. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
  a first body including a display located on at least one surface of the first body, an opening located on one side of the first body, a main circuit board, and a main earphone jack located on another side of the first body;
  a first audio signal processing body including a first circuit board, on which a sub-sound module receiving a digital audio signal from the first body and converting the digital audio signal into an analog audio signal is mounted, and a sub-earphone jack outputting the analog audio signal, the first audio signal processing body being in one of a first state where the first audio signal processing body is coupled with the opening of the first body and a second state where the first audio signal processing body is separated from the first body; and
  a controller configured to output a first audio signal to the sub-earphone jack and output a second audio signal to the main earphone jack in the first state,
  wherein in the first state, the controller is configured to cause the main earphone jack and the sub-earphone jack to be in one of an activated state of responding to the audio signal and an inactivated state of not responding to the audio signal.

2. The mobile terminal of claim 1, wherein the audio signal includes an event signal including a message reception event signal, a call reception event signal, and an alarm event signal and a content signal corresponding to sound contents stored.

3. The mobile terminal of claim 1, wherein the controller is configured to change an output object of the audio signal depending on a touch input of a user obtained through the display.

4. The mobile terminal of claim 1, wherein the audio signal includes an event signal including a message reception event signal, a call reception event signal, and an alarm event signal and a content signal corresponding to sound contents stored,
wherein the controller is configured to output the event signal and the content signal to one of the main earphone jack and the sub-earphone jack, and
wherein the controller is configured to output the content signal to the other of the main earphone jack and the sub-earphone jack.

5. The mobile terminal of claim 1, wherein the controller is configured to output status information obtained from another terminal to at least one of the main earphone jack and the sub-earphone jack.

6. The mobile terminal of claim 1, further comprising a second audio signal processing body including a second speaker and connected to the main earphone jack,
wherein the first audio signal processing body further includes a first speaker.

7. A mobile terminal audio signal processing system comprising:
a first body including a display located on at least one surface of the first body, an opening located on one side of the first body, a main circuit board, and a main earphone jack located on another side of the first body;
a second body having a shape, in which one end of the second body is capable of being inserted into the opening of the first body;
a first audio signal processing body including a first circuit board, on which a sub-sound module receiving a digital audio signal and converting the digital audio signal into an analog audio signal is mounted, and a sub-earphone jack outputting the analog audio signal, the first audio signal processing body having a shape, in which one end of the first audio signal processing body is capable of being inserted into the opening of the first body; and
a second audio signal processing body coupled with and separated from the first audio signal processing body, the second audio signal processing body including a second circuit board,
wherein the first body is in one of a first coupling mode, in which the first body is coupled with the second body, and a second coupling mode, in which the first body is coupled with the first audio signal processing body.

8. The mobile terminal audio signal processing system of claim 7, wherein when the first body is in the first coupling mode, the first body and the second body form a mobile terminal, and the first audio signal processing body and the second audio signal processing body form an audio signal processing device, and
wherein the mobile terminal includes a short range communication module wirelessly transmitting an audio signal to the audio signal processing device.

9. The mobile terminal audio signal processing system of claim 8, wherein when the mobile terminal is connected to the audio signal processing device, the mobile terminal includes a controller configured to output an audio signal to the audio signal processing device.

10. The mobile terminal audio signal processing system of claim 9, wherein when the mobile terminal is connected to the audio signal processing device, the controller is configured to install an application outputting the audio signal to the audio signal processing device in the mobile terminal if the application is not installed in the mobile terminal.

11. The mobile terminal audio signal processing system of claim 7, wherein when the first body is in the first coupling mode, the first body and the second body form a mobile terminal, and the first audio signal processing body and the second audio signal processing body form an audio signal processing device, and
wherein the second audio signal processing body includes a sub-USB module wired receiving an audio signal from the mobile terminal.

12. The mobile terminal audio signal processing system of claim 11, wherein when the mobile terminal is connected to the audio signal processing device, the mobile terminal includes a controller configured to output an audio signal to the audio signal processing device.

13. The mobile terminal audio signal processing system of claim 12, wherein when the mobile terminal is connected to the audio signal processing device, the controller is configured to install an application outputting the audio signal to the audio signal processing device in the mobile terminal if the application is not installed in the mobile terminal.

14. The mobile terminal audio signal processing system of claim 7, wherein a main sound module converting the digital audio signal into the analog audio signal is mounted on the main circuit board, and
wherein the sub-sound module converting the digital audio signal into the analog audio signal is mounted on the first circuit board.

15. The mobile terminal audio signal processing system of claim 14, further comprising a controller configured to cause the first body to transmit the digital audio signal to the main sound module in the first coupling mode and to transmit the digital audio signal to the sub-sound module in the second coupling mode.

16. The mobile terminal audio signal processing system of claim 7, wherein when the first body is in the second coupling mode, the first audio signal processing body and the first body form a mobile terminal, and
wherein the mobile terminal includes a controller configured to output a first audio signal to the sub-earphone jack and output a second audio signal to the main earphone jack.

17. The mobile terminal audio signal processing system of claim 16, wherein the mobile terminal is connected to the second audio signal processing body including a second speaker and connected to the main earphone jack,
wherein the first audio signal processing body includes a first speaker, and
wherein the controller is configured to output a first audio signal to the first speaker and output a second audio signal to the second speaker.

18. An audio signal processing device comprising:
a first audio signal processing body including a first circuit board, on which a sub-sound module receiving a digital audio signal and converting the digital audio signal into an analog audio signal is mounted, a sub-earphone jack outputting the analog audio signal, and a first connector; and a second audio signal processing body coupled with and separated from the first audio signal processing body, the second audio signal processing body including a second circuit board and a second connector corresponding to the first connector, wherein the first audio signal processing body is in one of a first processing mode, in which the first audio signal processing body is coupled with other terminal and receives the digital audio signal from the other terminal, a second processing mode, in which the first audio signal processing body wirelessly receives the digital audio signal from the other terminal separated from the first audio signal processing body, and a third processing mode, in which the first audio signal processing body receives the digital audio signal through the second audio signal processing body connected to the other terminal.

19. The audio signal processing device of claim 18, wherein the second audio signal processing body includes a sub-USB module, that is connected to the other terminal, receives the digital audio signal from the other terminal, and transmits the digital audio signal to the second circuit board, and wherein when the first audio signal processing body is in the third processing mode, the second circuit board transmits the transmitted digital audio signal to the first circuit board through the second connector and the first connector.

* * * * *